(12) United States Patent
Wang et al.

(10) Patent No.: US 11,917,465 B2
(45) Date of Patent: Feb. 27, 2024

(54) CELL HANDOVER METHOD AND APPARATUS

(71) Applicant: HUAWEI TECHNOLOGIES CO., LTD., Guangdong (CN)

(72) Inventors: Yu Wang, Hangzhou (CN); Rong Li, Hangzhou (CN); Xian Meng, Hangzhou (CN); Yunfei Qiao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 184 days.

(21) Appl. No.: 17/536,265

(22) Filed: Nov. 29, 2021

(65) Prior Publication Data

US 2022/0086711 A1 Mar. 17, 2022

Related U.S. Application Data

(63) Continuation of application No. PCT/CN2020/090023, filed on May 13, 2020.

(30) Foreign Application Priority Data

May 30, 2019 (CN) .......................... 201910462911.9

(51) Int. Cl.
*H04W 36/00* (2009.01)
*H04W 36/08* (2009.01)
*H04W 36/14* (2009.01)

(52) U.S. Cl.
CPC ....... *H04W 36/0083* (2013.01); *H04W 36/08* (2013.01); *H04W 36/14* (2013.01)

(58) Field of Classification Search
CPC .. H04W 36/0083; H04W 36/08; H04W 36/14
See application file for complete search history.

(56) References Cited

U.S. PATENT DOCUMENTS

2014/0148174 A1 5/2014 Teyeb et al.
2015/0358861 A1 12/2015 Chuberre et al.
(Continued)

FOREIGN PATENT DOCUMENTS

CN 102056250 A 5/2011
CN 107800472 A 3/2018
(Continued)

OTHER PUBLICATIONS

InterDigital Inc., Conditional Mobility for Non-Terrestrial Networks 3GPP TSG RAN WG2#106, R2-1907840, 3GPP, May 3, 2019, 6 pages.
InterDigital Inc., NR Connected Mode Mobility for Non-Terrestrial Networks (NTN) 3GPP TSG RAN WG2#106, R2-1907847, 3GPP, May 3, 2019, 11 pages.
(Continued)

*Primary Examiner* — Justin Y Lee

(57) ABSTRACT

In a cell handover method and apparatus, first network device of a first cell obtains user information of a terminal device, and then the first network device may determine handover information based on the user information and running information of the first network device, so that after the first network device sends an RRC message including the handover information to the terminal device, the terminal device may perform N consecutive cell handovers based on the handover information. In the N cell handovers, the first network device only needs to obtain the user information once, to configure handover conditions for the N subsequent handovers in advance at a time. This simplifies a network signaling procedure, reduces network overheads, and reduces handover response time. The embodiments of this disclosure are applicable to a network handover in a satellite scenario.

19 Claims, 7 Drawing Sheets

(56) References Cited

U.S. PATENT DOCUMENTS

2017/0111880 A1    4/2017  Park et al.
2019/0289505 A1*   9/2019  Thomas ................ H04W 68/04

FOREIGN PATENT DOCUMENTS

| CN | 108024297 A    | 5/2018 |
|----|----------------|--------|
| EP |     1655863 A1 | 5/2006 |
| EP |   2 880 913    | 6/2015 |
| WO | 2014/019740 A1 | 2/2014 |
| WO |  2015116870 A1 | 8/2015 |
| WO |  2018156696 A1 | 8/2018 |
| WO |  2018171941 A1 | 9/2018 |

OTHER PUBLICATIONS

Intel Corporation, Performance evaluation on exit condition for conditional handover, 3GPP TSG RAN WG2#105 R2-1900872, 3GPP, Feb. 15, 2019 (Reference indicating well-known art), 7 pages.

Ericsson, Conditional Handover in NR, 3GPP TSG RAN WG2#105, R2-1900404, 3GPP, Feb. 14, 2019 (Reference indicating well-known art), 7 pages.

Office Action dated Jan. 10, 2023 issued for Japanese Application No. 2021-570867 (2 pages).

CMCC Issues and solutions for SI message scheduling in NR-U 3GPP TSG-RAN WG2 Meeting #105, R2-1901942 Athens, Greece, Feb. 25-Mar. 1, 2019, 3 pages.

Extended European Search Report dated Jun. 8, 2022 issued for European Application No. 20812523.7 (8 pages).

\* cited by examiner

CELL HANDOVER METHOD AND APPARATUS

CROSS-REFERENCE TO RELATED APPLICATIONS

This application is a continuation of International Application No. PCT/CN2020/090023, filed on May 13, 2020, which claims priority to Chinese Patent Application No. 201910462911.9, filed on May 30, 2019. The disclosures of the aforementioned applications are hereby incorporated by reference in their entireties.

TECHNICAL FIELD

This disclosure relates to the field of communication technologies, and in particular, to a cell handover method and apparatus.

BACKGROUND

Satellite communication has advantages such as wide coverage, flexible networking, easy deployment and no geographical restriction. The advantages make satellite communication widely developed. In a satellite communication scenario, because a non-geostationary earth orbit (NGEO) satellite moves at a high speed, user terminal (user equipment, UE) in a connected state needs to be frequently handed over between different satellite cells, to ensure service continuity.

In the conventional technology, because a fifth generation (5G) mobile network is at an early stage of development, there is only a solution for implementing a cell handover between UE and a next generation base station on the ground in the 5G technology. Specifically, When the UE detects that signal quality of the UE in a current cell is poor, the UE reports a signal quality measurement report to the next generation base station on the ground. The next generation base station on the ground determines a target cell to be handed over to for the UE based on the received measurement report, and the UE performs a handover between the current cell and the target cell.

However, a transmission delay of the NGEO satellite is usually several milliseconds to tens of milliseconds and the cell handover solution in the conventional technology usually requires a relatively long response time (greater than the transmission delay of the NGEO satellite). Therefore, if the cell handover solution in the conventional technology is applied to a satellite scenario, the response time causes a handover failure, in other words, the cell handover solution in the conventional technology cannot be directly applied to the satellite scenario.

SUMMARY

This disclosure provides a cell handover method and apparatus, to resolve a technical problem that a network signaling procedure is complex and network overheads are large, and further provide a network handover solution applicable to a satellite scenario.

A first aspect of this disclosure provides a cell handover method, including the following.

A first network device of a first cell obtains user information of a terminal device, where the first cell is a current serving cell of the terminal device. The first network device determines handover information of the terminal device based on the user information and running information of the first network device, where the handover information is used to indicate the terminal device to perform N consecutive cell handovers, and N is a positive integer. The first network device sends a radio resource control (RRC) message to the terminal device, where the RRC message includes the handover information.

In the method, the first network device of the first cell obtains the user information of the terminal device, and then the first network device may determine the handover information based on the user information and the running information of the first network device, so that after the first network device sends the RRC message including the handover information to the terminal device, the terminal device may perform the N consecutive cell handovers based on the handover information. In the N cell handovers, the first network device only needs to obtain the user information once, to configure handover conditions for the N subsequent handovers in advance at a time. This simplifies a network signaling procedure, reduces network overheads, and reduces handover response time. This embodiment of this disclosure is applicable to a network handover in a satellite scenario.

In an example manner, the handover information includes N handover items, each handover item includes handover time information and configuration information of at least one second cell, the second cell is a next cell to be handed over to, and configuration information of each second cell includes a cell identifier, a cell frequency point value, and a handover condition. It may be understood that the second cell is a relative concept. After the terminal device is handed over to a second cell, the second cell becomes a current serving cell, and a next cell to be handed over to that is of the original second cell becomes a current second cell. A handover process is deduced by analogy.

In an example manner, a first network device of a first cell obtains user information of a terminal device by performing steps including: The first network device sends a measurement configuration message to the terminal device. The first network device receives a measurement report returned by the terminal device in response to the measurement configuration message, where the measurement report includes the user information of the terminal device.

In an example manner, the user information of the terminal device includes at least one of the following: geographical location information of the terminal device, service type information of the terminal device, terminal capability information of the terminal device, and movement status information of the terminal device.

In the method, it is considered that the geographical location information, the service type information, the terminal capability information, and the movement status information that are of the terminal device can better feed back a signal quality change status of the terminal device. Therefore, the geographical location information, the service type information, the terminal capability information, and the movement status information that are of the terminal device can be used to obtain relatively accurate handover information when the handover information is subsequently determined based on the user information of the terminal device.

In an example manner, a closer distance between a geographical location of the terminal device and a central location of the first cell indicates a larger value of N. Alternatively, when the service type information of the terminal device is statistical duration of a service, longer statistical duration of the service of the terminal device indicates a larger value of N. Alternatively, when the movement status information of the terminal device includes a movement speed of the terminal device, a faster movement speed of the terminal device indicates a smaller value of N. Alternatively, when the capability information of the terminal device includes a buffering capability and/or a computing capability, a stronger buffering capability and/or a stronger computing capability of the terminal device indicate/indicates a larger value of N.

In an example manner, the running information of the first network device includes at least one of the following: location information of the first network device and neighboring cell information of the first cell.

In an example manner, N is any positive integer from 1 to 8.

In this method, a period when a singer satellite goes over the top of the terminal device and a beam distribution status of the single satellite are considered. If a value of N is excessively large, an accurate configurable cell to be handed over to may not be allocated to the terminal device. Therefore, the value of N is set to between 1 and 8, to obtain the accurate next cell to be handed over to.

In an example manner, after the first network device determines the handover information of the terminal device based on the user information and the running information of the first network device, the method further includes: The first network device determines an earliest handover time period based on handover time information in the N handover items. The first network device sends a resource reservation request to a second network device of a target cell, where the target cell is a second cell included in a handover item corresponding to the earliest handover time period, and the resource reservation request is used to request the second network device of the target cell to reserve a resource for the terminal device within the earliest handover time period. The first network device receives a reservation response message of the second network device of the target cell.

In this method, because the second network device reserves a resource for the terminal device within a specified time, a handover failure caused by resource occupation when the terminal device is handed over to the second network device can be avoided, thereby ensuring handover robustness.

In an example manner, a handover command information element carried in the RRC message includes the handover information.

In an example manner, the handover time information included in each handover item is a measurement start time and a first time offset; or a measurement end time and a second time offset; or a measurement start time and a measurement end time.

In an example manner, after the first network device determines the handover information based on the user information and the running information of the first network device, the method further includes: The first network device stores the handover information.

In an example manner, the first network device is a satellite or a core network device communicating with a satellite.

A second aspect of this disclosure provides a cell handover method, including:

A terminal device sends user information of the terminal device to a first network device of a first cell, where the first cell is a current serving cell of the terminal device. The terminal device receives a radio resource control RRC message sent by the first network device, where the RRC message includes handover information, the handover information is determined based on the user information and running information of the first network device, the handover information is used to indicate the terminal device to perform N consecutive cell handovers, N is a positive integer, and the following N is also a positive integer.

In the method, the terminal device sends the user information of the terminal device to the first network device of the first cell, and then the first network device may determine the handover information based on the user information and the running information of the first network device, so that after the first network device sends the RRC message including the handover information to the terminal device, the terminal device may perform the N consecutive cell handovers based on the handover information. In the N cell handovers, the terminal device only needs to send the user information to the first network device of the first cell once, to configure handover conditions for the N subsequent handovers in advance at a time, thereby simplifying a network signaling procedure and reducing network overheads. Further, handover response time can be reduced, so that this embodiment of this disclosure is applicable to a network handover in a satellite scenario.

In an example manner, the handover information includes N handover items, each handover item includes handover time information and configuration information of at least one second cell, the second cell is a next cell to be handed over to, and configuration information of each second cell includes a cell identifier, a cell frequency point value, and a handover condition.

In an example manner, the terminal device performs the N consecutive cell handovers based on the handover information including: The terminal device performs the handovers based on a sequence of the handover time information included in the N handover items. The terminal device performs a handover based on each handover item including: measuring, in the handover time information included in the handover item, signal quality of a second cell included in the handover item; when signal quality of a target cell in the second cell included in the handover item meets a handover condition of the target cell, sending a handover instruction to the target cell; and when the terminal device is handed over to the target cell, performing, by the terminal device, a handover operation of a next handover item whose handover time information is adjacent to the handover time information of the handover item.

In an example manner, the terminal device performs a handover based on each handover item further including: When there is no second cell whose signal quality meets the handover condition in the handover time included in the handover item, the terminal device terminates a procedure of the N cell handovers.

In an example manner, the user information of the terminal device includes at least one of the following: geographical location information of the terminal device, service type information of the terminal device, terminal capability information of the terminal device, and movement status information of the terminal device.

In the method, it is considered that the geographical location information, the service type information, the terminal capability information, and the movement status information that are of the terminal device can better feed back a signal quality change status of the terminal device. Therefore, the geographical location information, the service type information, the terminal capability information, and the movement status information that are of the terminal device can be used to obtain relatively accurate handover information when the handover information is subsequently determined based on the user information of the terminal device.

In an example manner, a closer distance between a geographical location of the terminal device and a central location of the first cell indicates a larger value of N. Alternatively, when the service type information of the terminal device is statistical duration of a service, longer statistical duration of the service of the terminal device indicates a larger value of N. Alternatively, when the movement status information of the terminal device includes a movement speed of the terminal device, a faster movement speed of the terminal device indicates a smaller value of N. Alternatively, when the capability information of the terminal device includes a buffering capability and/or a computing capability, a stronger buffering capability and/or a stronger computing capability of the terminal device indicate/indicates a larger value of N.

In an example manner, the running information of the first network device includes at least one of the following: location information of the first network device and neighboring cell information of the first cell.

In an example manner, N is any positive integer from 1 to 8.

In this method, a period when a singer satellite goes over the top of the terminal device and a beam distribution status of the single satellite are considered. If a value of N is excessively large, an accurate configurable cell to be handed over to may not be allocated to the terminal device. Therefore, the value of N is set to between 1 and 8, to obtain the accurate next cell to be handed over to.

In an example manner, a terminal device sends user information of the terminal device to a first network device of a first cell including: The terminal device receives a measurement configuration message sent by the first network device of the first cell. The terminal device returns a measurement report to the first network device in response to the measurement configuration message, where the measurement report includes the user information of the terminal device.

In an example manner, a handover command information element carried in the RRC message includes the handover information.

In an example manner, the handover time information included in each handover item is a measurement start time and a first time offset; or a measurement end time and a second time offset; or a measurement start time and a measurement end time.

In an example manner, after the terminal device receives the radio resource control RRC message sent by the first network device, the method further includes: The terminal device stores the handover information.

In an example manner, the first network device is a satellite or a core network device communicating with a satellite.

A third aspect of this disclosure provides a first network device, including:
  an obtaining module, configured to obtain user information of a terminal device, where the first cell is a current serving cell of the terminal device; a determining module, configured to determine handover information of the terminal device based on the user information and running information of the first network device, where the handover information is used to indicate the terminal device to perform N consecutive cell handovers, and N is a positive integer; and a sending module, configured to send a radio resource control (RRC) message to the terminal device, where the RRC message includes the handover information.

In the apparatus, the first network device of the first cell obtains the user information of the terminal device, and then the first network device may determine the handover information based on the user information and the running information of the first network device, so that after the first network device sends the RRC message including the handover information to the terminal device, the terminal device may perform the N consecutive cell handovers based on the handover information. In the N cell handovers, the first network device only needs to obtain the user information once, to configure handover conditions for the N subsequent handovers in advance at a time, thereby simplifying a network signaling procedure and reducing network overheads. Further, handover response time can be reduced, so that this embodiment of this disclosure is applicable to a network handover in a satellite scenario.

In an example manner, the handover information includes N handover items, each handover item includes handover time information and configuration information of at least one second cell, the second cell is a next cell to be handed over to, and configuration information of each second cell includes a cell identifier, a cell frequency point value, and a handover condition.

In an example manner, the obtaining module is further configured to send a measurement configuration message to the terminal device, and receive a measurement report returned by the terminal device in response to the measurement configuration message, where the measurement report includes the user information of the terminal device.

In an example manner, the user information of the terminal device includes at least one of the following: geographical location information of the terminal device, service type information of the terminal device, terminal capability information of the terminal device, and movement status information of the terminal device.

In the apparatus, it is considered that the geographical location information, the service type information, the terminal capability information, and the movement status information that are of the terminal device can better feed back a signal quality change status of the terminal device. Therefore, the geographical location information, the service type information, the terminal capability information, and the movement status information that are of the terminal device can be used to obtain relatively accurate handover information when the handover information is subsequently determined based on the user information of the terminal device.

In an example manner, a closer distance between a geographical location of the terminal device and a central location of the first cell indicates a larger value of N. Alternatively, when the service type information of the terminal device is statistical duration of a service, longer statistical duration of the service of the terminal device indicates a larger value of N. Alternatively, when the movement status information of the terminal device includes a movement speed of the terminal device, a faster movement speed of the terminal device indicates a smaller value of N. Alternatively, when the capability information of the terminal device includes a buffering capability and/or a computing capability, a stronger buffering capability and/or a stronger computing capability of the terminal device indicate/indicates a larger value of N.

In an example manner, the running information of the first network device includes at least one of the following:

location information of the first network device and neighboring cell information of the first cell.

In an example manner, N is any positive integer from 1 to 8.

In the apparatus, a period when a singer satellite goes over the top of the terminal device and a beam distribution status of the single satellite are considered. If a value of N is excessively large, an accurate configurable cell to be handed over to may not be allocated to the terminal device. Therefore, the value of N is set to between 1 and 8, to obtain the accurate next cell to be handed over to.

In an example manner, the apparatus further includes a resource reservation module, configured to: determine an earliest handover time period based on handover time information in the N handover items; send a resource reservation request to a second network device of a target cell, where the target cell is a second cell included in a handover item corresponding to the earliest handover time period, and the resource reservation request is used to request the second network device of the target cell to reserve a resource for the terminal device within the earliest handover time period; and receive a reservation response message of the second network device of the target cell.

In this method, because the second network device reserves a resource for the terminal device within a specified time, a handover failure caused by resource occupation when the terminal device is handed over to the second network device can be avoided, thereby ensuring handover robustness.

In an example manner, a handover command information element carried in the RRC message includes the handover information.

In an example manner, the handover time information included in each handover item is a measurement start time and a first time offset; or a measurement end time and a second time offset; or a measurement start time and a measurement end time.

In an example manner, the apparatus further includes a storage module, configured to store the handover information.

In an example manner, the first network device is a satellite or a core network device communicating with a satellite.

A fourth aspect of this disclosure provides a terminal device, including:
 a sending module, configured to send user information of the terminal device to a first network device of a first cell, where the first cell is a current serving cell of the terminal device; and a receiving module, configured to receive a radio resource control RRC message sent by the first network device, where the RRC message includes handover information, and the handover information is determined based on the user information and running information of the first network device; and the handover information is used to indicate the terminal device to perform N consecutive cell handovers, and N is a positive integer.

In the apparatus, the terminal device sends the user information of the terminal device to the first network device of the first cell, and then the first network device may determine the handover information based on the user information and the running information of the first network device, so that after the first network device sends the RRC message including the handover information to the terminal device, the terminal device may receive the handover information, and may perform the N consecutive cell handovers based on the handover information. In the N cell handovers, the terminal device only needs to send the user information to the first network device of the first cell once, to configure handover conditions for the N subsequent handovers in advance at a time, thereby simplifying a network signaling procedure and reducing network overheads. Further, handover response time can be reduced, so that this embodiment of this disclosure is applicable to a network handover in a satellite scenario.

In an example manner, the handover information includes N handover items, each handover item includes handover time information and configuration information of at least one second cell, the second cell is a next cell to be handed over to, and configuration information of each second cell includes a cell identifier, a cell frequency point value, and a handover condition.

In an example manner, the terminal device performs the N consecutive cell handovers based on the handover information including: The terminal device performs the handovers based on a sequence of the handover time information included in the N handover items. The terminal device performs a handover based on each handover item including: measuring, in the handover time information included in the handover item, signal quality of a second cell included in the handover item; when signal quality of a target cell in the second cell included in the handover item meets a handover condition of the target cell, sending a handover instruction to the target cell; and when the terminal device is handed over to the target cell, performing, by the terminal device, a handover operation of a next handover item whose handover time information is adjacent to the handover time information of the handover item.

In an example manner, the terminal device performs a handover based on each handover item further including: When there is no second cell whose signal quality meets the handover condition in the handover time included in the handover item, the terminal device terminates a procedure of the N cell handovers.

In an example manner, the user information of the terminal device includes at least one of the following: geographical location information of the terminal device, service type information of the terminal device, terminal capability information of the terminal device, and movement status information of the terminal device.

In the apparatus, it is considered that the geographical location information, the service type information, the terminal capability information, and the movement status information that are of the terminal device can better feed back a signal quality change status of the terminal device. Therefore, the geographical location information, the service type information, the terminal capability information, and the movement status information that are of the terminal device can be used to obtain relatively accurate handover information when the handover information is subsequently determined based on the user information of the terminal device.

In an example manner, a closer distance between a geographical location of the terminal device and a central location of the first cell indicates a larger value of N. Alternatively, when the service type information of the terminal device is statistical duration of a service, longer statistical duration of the service of the terminal device indicates a larger value of N. Alternatively, when the movement status information of the terminal device includes a movement speed of the terminal device, a faster movement speed of the terminal device indicates a smaller value of N. Alternatively, when the capability information of the terminal device includes a buffering capability and/or a computing capability, a stronger buffering capability and/or a stronger computing capability of the terminal device indicate/indicates a larger value of N.

In an example manner, the running information of the first network device includes at least one of the following: location information of the first network device and neighboring cell information of the first cell.

In an example manner, N is any positive integer from 1 to 8.

In the apparatus, a period when a singer satellite goes over the top of the terminal device and a beam distribution status of the single satellite are considered. If a value of N is excessively large, an accurate configurable cell to be handed over to may not be allocated to the terminal device. Therefore, the value of N is set to between 1 and 8, to obtain the accurate next cell to be handed over to.

In an example manner, the sending module is further configured to receive a measurement configuration message sent by the first network device of the first cell. The terminal device returns a measurement report to the first network device in response to the measurement configuration message, where the measurement report includes the user information of the terminal device.

In an example manner, a handover command information element carried in the RRC message includes the handover information.

In an example manner, the handover time information included in each handover item is a measurement start time and a first time offset; or a measurement end time and a second time offset; or a measurement start time and a measurement end time.

In an example manner, the apparatus further includes a storage module, configured to store the handover information.

In an example manner, the first network device is a satellite or a core network device communicating with a satellite.

A fifth aspect of this disclosure provides a cell handover method, including: A terminal device sends user information of the terminal device to a first network device of a first cell, where the first cell is a current serving cell of the terminal device. The first network device of the first cell obtains the user information of the terminal device. The first network device determines handover information of the terminal device based on the user information and running information of the first network device, where the handover information is used to indicate the terminal device to perform N consecutive cell handovers, and N is a positive integer. The first network device sends a radio resource control RRC message to the terminal device, where the RRC message includes the handover information. The terminal device receives the radio resource control RRC message sent by the first network device.

A sixth aspect of this disclosure provides a satellite communication system, where the satellite communication system includes a first network device and a terminal device, the first network device is the first network device according to the first aspect and any implementation of the first aspect, and the terminal device is the terminal device according to the second aspect and any implementation of the second aspect.

A seventh aspect of this disclosure provides a computer storage medium, including computer program instructions. When the computer program instructions are run on a computer, the computer is enabled to perform the method provided in any one of the foregoing implementations.

An eighth aspect of this disclosure provides a computer program product, where the computer program product includes computer-readable instructions. When the computer-readable instructions are executed by a processor, the method provided in any of the foregoing implementations is implemented.

A ninth aspect of this disclosure provides a wireless communication apparatus, including a processor, a memory, and a transceiver, where the memory is configured to store a computer program, the transceiver is configured to communicate with another device, and the processor is configured to execute the computer program stored in the memory, so that the wireless communication apparatus performs the method according to any one of the first aspect.

A tenth aspect of this disclosure provides a wireless communication apparatus, including a processor, a memory, and a transceiver, where the memory is configured to store a computer program, the transceiver is configured to communicate with another device, and the processor is configured to execute the computer program stored in the memory, so that the wireless communication apparatus performs the method according to any one of the second aspect.

An eleventh aspect of this disclosure provides a system on a chip or a system chip, where the system on a chip or the system chip may be used in a network device. The system on a chip or the system chip includes at least one communication interface, at least one processor, and at least one memory; and the communication interface, the memory, and the processor are interconnected through a bus. The processor executes instructions stored in the memory, so that the network device can perform the method according to the first aspect.

A twelfth aspect of this disclosure provides a system on a chip or a system chip, where the system on a chip or the system chip may be used in a terminal device. The system on a chip or the system chip includes at least one communication interface, at least one processor, and at least one memory; and the communication interface, the memory, and the processor are interconnected through a bus. The processor executes instructions stored in the memory, so that the terminal device performs the method according to the second aspect.

Embodiments of this disclosure provide the cell handover method and apparatus. The cell currently serving the terminal device is the first cell, and the first network device of the first cell obtains the user information of the terminal device, and then the first network device may determine the handover information based on the user information and the running information of the first network device, so that after the first network device sends the RRC message including the handover information to the terminal device, the terminal device may perform the N consecutive cell handovers based on the handover information. In the N cell handovers, the first network device only needs to obtain the user information once, to configure the handover conditions for the N subsequent handovers in advance at a time, thereby simplifying the network signaling procedure and reducing the network overheads. Further, the handover response time can be reduced, so that the embodiments of this disclosure are applicable to the network handover in the satellite scenario.

DESCRIPTION OF EMBODIMENTS

This disclosure provides a cell handover method. The method in this disclosure may be applied to a 5G system, or may be applied to long term evolution (LTE). The 5G system is also referred to as a new wireless communication system, a new radio (NR) system, or a next-generation mobile communication system.

Figure 1:
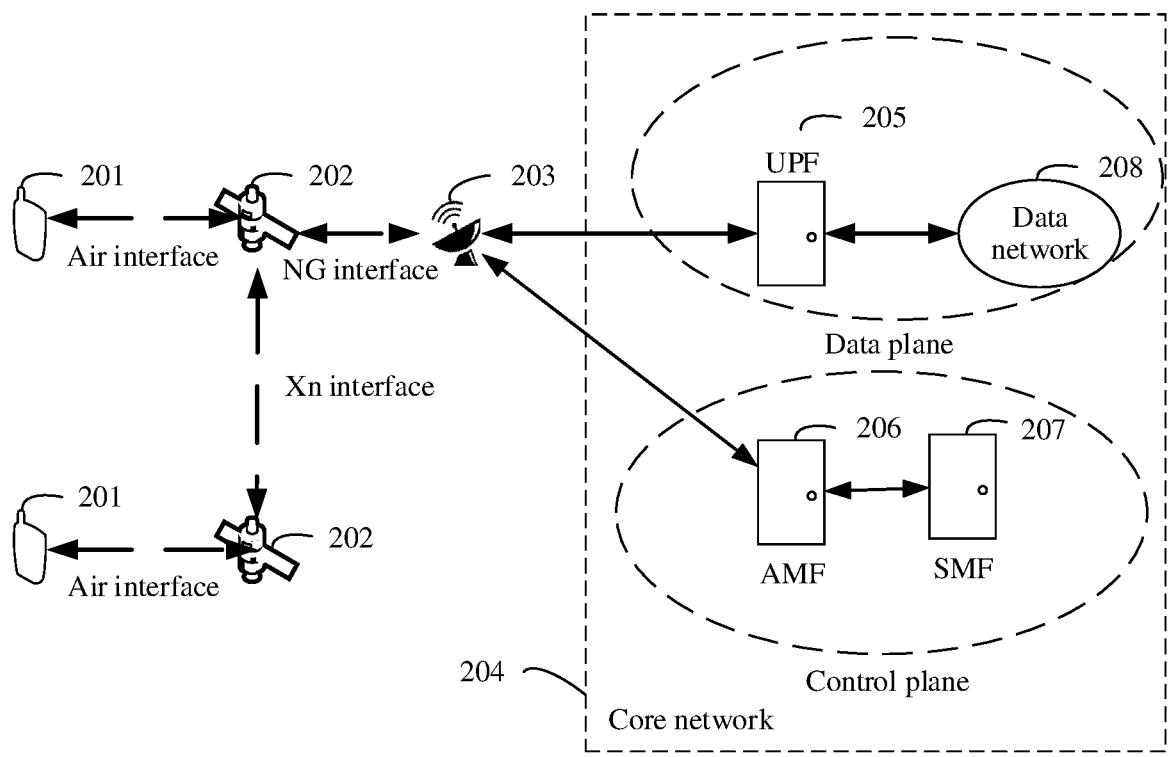
FIG. 1 is a schematic diagram of an existing 5G network architecture.
Figure 2:
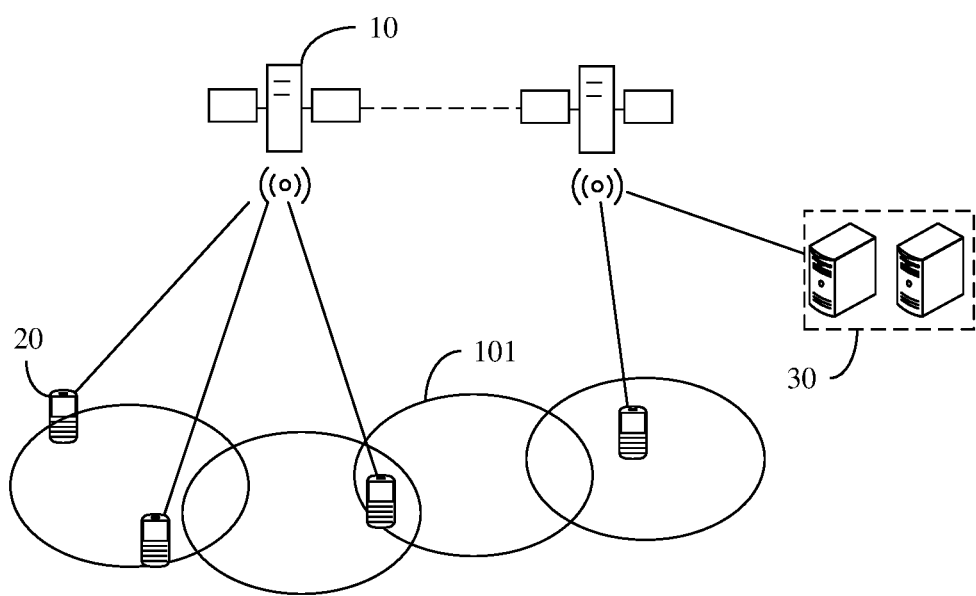
FIG. 2 is a schematic diagram of an application scenario of a cell handover method according to an embodiment of this disclosure.

FIG. 1 is a schematic diagram of a typical network architecture of a satellite communication system. As shown in FIG. 1, a satellite communication system 200 includes terminal devices 201, satellite base stations 202, a ground station 203, and a core network 204. The core network 204 mainly includes a user plane function (UPF) unit 205, an access and mobility management function (AMF) unit 206, a session management function (SMF) unit 207, and a data network (DN) 208. The terminal devices 201 communicate with the satellite base stations 202 by accessing a network through air interfaces, and the satellite base stations 202 are connected to the core network 204 on the ground through radio links (for example, next generation (NG) network interfaces). In addition, there is also a radio link between the satellite base stations 202, and signaling exchange and user data transmission between the satellite base stations are completed through an Xn interface. The network elements and the interfaces shown in FIG. 2 are described as follows.

The terminal device 201 in this embodiment of this disclosure may be user equipment (UE), an access terminal, a subscriber unit, a subscriber station, a mobile station, a remote station, a remote terminal, a mobile device, a user terminal, a terminal, a wireless communication device, a user agent, or a user apparatus. The terminal devices 201 may access a satellite network through air interfaces and initiate services such as making a call or accessing the Internet, and the terminal device 201 may be a mobile device that support 5G new radio (new radio). Typically, the terminal device 201 may be a mobile phone, a tablet computer, a portable notebook computer, a virtual/mixed/augmented reality device, a navigation device, a ground base station (for example, a new radio NodeB (NR nodeB, gNB)) and a ground station (GS), a session initiation protocol (SIP) telephone, a wireless local loop (WLL) station, a personal digital assistant (PDA), a handheld device having a satellite communication function, a computing device or another processing device connected to a wireless modem, a vehicle-mounted device, a wearable device, a terminal device in a 5G network, a terminal device in a future evolved public land mobile network (PLMN), or a terminal device in another future communication system.

The satellite base station 202 mainly provides a radio access service for the terminal device 201, schedule a radio resource for the terminal device accessing the satellite base station, and provide a reliable radio transmission protocol, a data encryption protocol, and the like. The satellite base station is a station that uses an artificial earth satellite, a high altitude aircraft, and the like for wireless communication, for example, an evolved base station and a 5G base station. The satellite base station may be a medium earth orbit (MEO) satellite and a low earth orbit (LEO) satellite that are of a non-geostationary satellite orbit, or may be a high altitude platform station (HAPS).

In this embodiment of this disclosure, the ground station 203 is mainly responsible for forwarding signaling and service data between the satellite base stations 202 and the core network 204. The ground station is usually a ground device that is disposed on the surface of the earth (including being disposed on a ship or an airplane) to perform artificial satellite communication. The ground station mainly includes a high-gain antenna system that can trace an artificial satellite, a high-power microwave transmission system, a low-noise receiving system, a power supply system, and the like.

The core network 204 is mainly used for user access control, charging, mobility management, session management, user security authentication, a supplementary service, and the like. In this embodiment of this disclosure, the core network 204 mainly includes the user plane function unit 205, the access and mobility management function unit 206, the session management function unit 207, and the data network 208. The AMF unit is mainly responsible for services such as mobility management and access management. The SMF unit is mainly responsible for session management, a dynamic host configuration protocol function, selection and control of user plane functions, and the like. The UPF unit is mainly responsible for functions related to external connection to the data network, user plane data packet routing and forwarding, packet filtering, quality of service (QoS) control, and the like. It should be noted that these function units may work independently, or may be combined together to implement some control functions, for example, access control and mobility management functions such as access authentication, security encryption, and location registration of the terminal device, and session management functions such as establishment, release, and change of a user plane transmission path. The core network further includes other function units, but the function units are not listed one by one.

For example, FIG. 2 is a schematic diagram of an application scenario in which a cell handover method according to an embodiment of this disclosure is applied to a 5G mobile satellite communication system.

A satellite 10 may provide a communication service for a terminal device 20, and the satellite 10 may further be connected to a core network device 30 (the core network device 30 may include the ground station in the foregoing typical architecture, or include a network element that can implement a function of forwarding service data and signaling that are of a satellite base station or a core network). Each satellite 10 may serve a plurality of cells 101, each cell has a corresponding cell identifier, and the cell identifier may be used to uniquely identify the cell. The terminal device 20 may be handed over in different cells.

In the embodiments of this disclosure, a method on a terminal device side may be performed by the terminal device, or may be performed by an apparatus in the terminal device (it should be noted that the terminal device is used as an example for description in the embodiments provided in this disclosure). For example, the apparatus in the terminal device may be a chip system, a circuit, a module, or the like. This is not limited in this disclosure.

In the embodiments of this disclosure, a method on a first network device side may be performed by a first network device, or may be performed by an apparatus in a first network device. For example, the apparatus in the first network device may be a chip system, a circuit, a module, or the like. This is not limited in this disclosure.

The terminal device in the embodiments of this disclosure may include a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant communication software.

The first network device in the embodiments of this disclosure may be a satellite, a base station, a transmission reception point (TRP), a core network device, or the like.

A first cell in the embodiments of this disclosure may be a serving cell that currently serving the terminal device, and the first network device provides a service for the first cell.

A second cell in the embodiments of this disclosure may be a next possible configurable cell to which the terminal device may be handed over (namely, a next cell to be handed over to), and a second network device provides a service for the second cell. It may be understood that the second cell is a relative concept. After the terminal device is handed over to a second cell, the second cell becomes a current serving cell, and a next cell to be handed over to that is of the original second cell becomes a current second cell. A handover process is deduced by analogy.

A cell handover in the embodiments of this disclosure may be that a mobile terminal is handed over from a current serving cell to a next cell to be handed over to, to implement a handover from the serving cell to a configurable cell.

N consecutive cell handovers in the embodiments of this disclosure may be a process in which the terminal device sequentially performs the first handover to the $N^{th}$ handover within a period of time. It may be understood that if the terminal device fails to be handed over in any one of the N handovers within the period of time, a process of the consecutive handovers ends.

The following uses specific embodiments to describe in detail technical solutions of this disclosure and how the foregoing technical problems are resolved by using the technical solutions of this disclosure. The following several specific embodiments may be combined with each other, and same or similar concepts or processes may not be described repeatedly in some embodiments.

Figure 3:
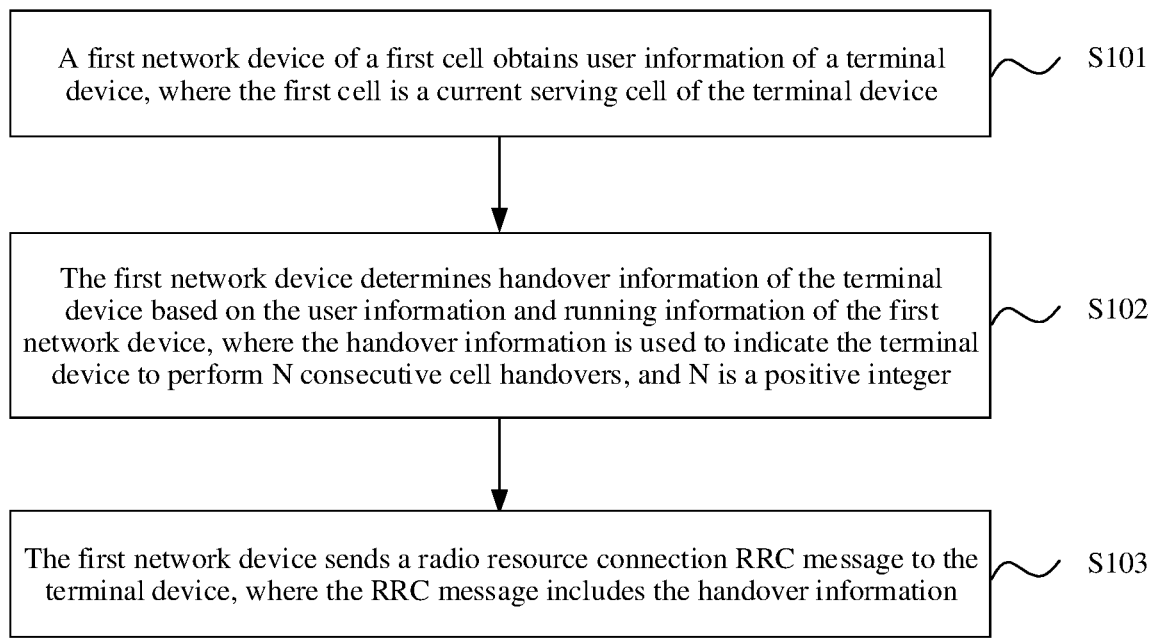
FIG. 3 is a schematic flowchart of a cell handover method according to an embodiment of this disclosure.

FIG. 3 is a flowchart of a cell handover method according to an embodiment of this disclosure. As shown in FIG. 3, the method provided in this embodiment includes the following steps.

Step S101: A first network device of a first cell obtains user information of a terminal device, where the first cell is a current serving cell of the terminal device.

In this embodiment of this disclosure, the first cell is the current serving cell of the terminal device, and the current serving cell may be alternatively understood as a cell accessed by the terminal device.

In a specific application, the first network device may be a device that provides a service for the first cell. For example, the first network device may be a satellite.

In this embodiment of this disclosure, the user information of the terminal device may be information that can reflect a signal quality change trend of the terminal device in the first cell. The user information may be specifically determined based on an actual application scenario. This is not specifically limited in this embodiment of this disclosure.

Step S102: The first network device determines handover information of the terminal device based on the user information and running information of the first network device, where the handover information is used to indicate the terminal device to perform N consecutive cell handovers, and N is a positive integer.

In this embodiment of this disclosure, when the first network device is the satellite, the running information of the first network device is running information of the satellite. The running information of the first network device may be used to feed back a running track of the satellite. Specific content of the running information of the first network device may be determined based on an actual application scenario. This is not specifically limited in this embodiment of this disclosure.

In this embodiment of this disclosure, the handover information is used to indicate the terminal device to perform the N consecutive cell handovers, and N is a positive integer. It may be understood that the handover information is only used to indicate the terminal device to perform the N consecutive cell handovers. In an actual application, the terminal device may determine a specific quantity of handovers based on an actual application scenario. For example, the terminal device may perform the complete N consecutive cell handovers based on an indication of the handover information. Alternatively, after receiving the handover information, the terminal device may perform only N−1 cell handovers or N−2 cell handovers. A specific value of N may be determined based on an actual application scenario. In addition, the specific value of N may further be determined based on information sent or received by a user in a network, running information of a satellite network, or a combination of the two. This is not specifically limited in this embodiment of this disclosure.

Step S103: The first network device sends an RRC message to the terminal device, where the RRC message includes the handover information.

In this embodiment of this disclosure, the RRC message may be a conditional handover (CHO) command message, or may be another message. This is not specifically limited in this embodiment of this disclosure.

It may be understood that after receiving the handover information of the first network device, the terminal device may automatically perform the N consecutive cell handovers based on the handover information, so that in this embodiment of this disclosure, measurement events and trigger conditions for the subsequent N handovers can be configured in advance at a time by using features of predictability, namely, the track of the satellite and the user information of terminal device, thereby simplifying a network signaling procedure and reducing network overheads. N is a positive integer.

Optionally, in step S101, the first network device may actively initiate an action of obtaining the user information of the terminal device. For example, a first network device of a first cell obtains user information of a terminal device including: The first network device sends a measurement configuration message to the terminal device. The first network device receives a measurement report returned by the terminal device in response to the measurement configuration message, where the measurement report includes the user information of the terminal device.

In this embodiment of this disclosure, the measurement configuration message sent by the first network device to the terminal device may be used to indicate the terminal device to measure the user information. Specifically, the measurement configuration message may carry a configuration item required for configuring the handover information, and the configuration item may be determined based on an actual application scenario. This is not specifically limited in this embodiment of this disclosure.

The terminal device may measure the user information of the terminal device in response to the measurement configuration message, and return the measurement report that includes the user information of the terminal device to the first network device. In this case, the first network device may obtain the user information of the terminal device, where the user information may be determined based on an actual application scenario. This is not specifically limited in this embodiment of this disclosure.

It may be understood that the terminal device may also actively report the user information to the first network device. For example, the terminal device may periodically and actively send the user information of the terminal device to the first network device. Alternatively, after detecting that an environment change exceeds a threshold, the terminal device is triggered to send the user information of the terminal device to the first network device, so that the first network device can obtain the user information of the terminal device. In this embodiment of this disclosure, a manner of obtaining the user information of the terminal device by the first network device of the first cell is not specifically limited.

Optionally, in step S101, the user information of the terminal device includes at least one of the following: geographical location information of the terminal device, service type information of the terminal device, terminal capability information of the terminal device, and movement status information of the terminal device.

In this embodiment of this disclosure, the geographical location information of the terminal device may be used to feed back a distance between the terminal device and a cell center of the first cell. It may be understood that a closer distance between the terminal device and the cell center of the first cell generally indicates better signal quality of the terminal device. Adaptively, the terminal device may not be handed over to another cell temporarily. A farther distance between the terminal device and the cell center of the first cell generally indicates poorer signal quality of the terminal device. Adaptively, the terminal device may need to be handed over to the another cell.

A case that generally, because a distance between a ground base station and the terminal device is relatively close, reference signal received power (RSRP) or reference signal received quality (RSRQ) of the terminal device when the terminal device is at the cell center and those of the terminal device when the terminal device is at a cell edge are relatively different is considered. Therefore, generally, the terminal device is handed over between cells mainly based on RSRP or RSRQ of the terminal device when the terminal device is in a cell. However, in an NGEO satellite scenario, because a distance between the satellite and the terminal device is relatively far, the difference between the RSRP or the RSRQ of the terminal device when the terminal device is at the cell center and those of the terminal device when the terminal device is at the cell edge is relatively small, a location of the terminal device relative to the cell center cannot be determined by using the RSRP or the RSRQ. Therefore, in this embodiment of this disclosure, the user information of the terminal device includes the geographical location information of the terminal device, and the location of the terminal device relative to the cell center may be determined based on the geographical location information of the terminal device. In this way, when the handover information is subsequently determined based on the user information of the terminal device in this disclosure, relatively accurate handover information can be obtained.

The service type information of the terminal device may be used to feed back possible duration of a current service of the terminal device. Specifically, for a service of each terminal device, a possible duration of the service may be statistical duration calculated based on historical behavior data of a plurality of users. For example, if the service is video playback, the video playback generally lasts for a long time. Therefore, statistical duration of the video playback service is long. It may be understood that, shorter possible duration of the current service of the terminal device indicates a higher probability that the terminal device can complete the current service without performing a cell handover. Longer possible duration of the current service of the terminal device indicates a higher probability that the terminal device needs to perform a plurality of handovers in a plurality of cells. In this embodiment of this disclosure, the user information of the terminal device includes the service type information of the terminal device, and whether the terminal device needs to perform the plurality of handovers in the plurality of cells may be determined based on the service type information of the terminal device. In this way, when the handover information is subsequently determined based on the user information of the terminal device in this disclosure, the relatively accurate handover information can be obtained.

The terminal capability information of the terminal device may be used to feed back quality of service processing of the terminal device and quality of communication between the terminal device and a cell. Specifically, the terminal capability information may include a network environment, a hardware capability (for example, resolution of a screen of the terminal device, a processing speed of a central processing unit (CPU), resolution of a camera, and the like), a media processing capability (namely, an audio and video encoding and decoding capability), a service support capability (for example, scheduling, conferencing, and instant messaging), and the like that are of the terminal device. It may be understood that stronger terminal capability information of the terminal device generally indicates better signal quality between the terminal device and the first cell. Adaptively, the terminal device may not be handed over to the another cell temporarily. Weaker terminal capability information of the terminal device generally indicates poorer signal quality of the terminal device. Adaptively, the terminal device may need to be handed over to the another cell. In this embodiment of this disclosure, the user information of the terminal device includes the terminal capability information of the terminal device, and whether the terminal device needs to perform the plurality of handovers in the plurality of cells may be determined by using the terminal capability information of the terminal device. In this way, when the handover information is subsequently determined based on the user information of the terminal device in this disclosure, the relatively accurate handover information can be obtained.

The movement status information of the terminal device may be used to feed back that the terminal device is in a low-speed movement state, a normal-speed movement state, or a high speed movement state. A specific speed value of a low speed, a normal speed, or a high speed may be set based on an actual application scenario. This is not specifically limited in this embodiment of this disclosure. It may be understood that a faster movement speed of the terminal device indicates a higher probability that the terminal device needs to be handed over in the plurality of cells. A slower movement speed of the terminal device indicates a higher probability that the terminal device does not need to perform the cell handover or performs a relatively small quantity of cell handovers. In this embodiment of this disclosure, the user information of the terminal device includes the movement status information of the terminal device, and whether the terminal device needs to perform the plurality of handovers in the plurality of cells may be determined by using the movement status information of the terminal device. In this way, when the handover information is subsequently determined based on the user information of the terminal device in this disclosure, the relatively accurate handover information can be obtained.

Optionally, in step S102, the running information of the first network device includes at least one of the following: location information of the first network device and neighboring cell information of the first cell.

In this embodiment of this disclosure, a running track of the first network device may be predicted based on the location information of the first network device and the neighboring cell information of the first cell. In this way, in this embodiment of this disclosure, the accurate handover information of the terminal device may be determined based on the movement information of the first network device and the user information of the terminal device.

Optionally, in step S102, the handover information includes N handover items, each handover item includes handover time information and configuration information of at least one second cell, the second cell is a next cell to be handed over to, and configuration information of each second cell includes a cell identifier, a cell frequency point value, and a handover condition.

In this embodiment of this disclosure, each handover item may correspond to one cell handover of the terminal device. The handover time information in the handover item may be used to indicate a handover time of the terminal device. The second cell in the handover item is a configurable cell configured for the terminal device based on an actual application scenario. It may be understood that the second cell (a second network device) is a relative concept. After the terminal device is handed over to a second cell, the second cell becomes a current serving cell (the first cell), and a next cell to be handed over to that is of the original second cell becomes a current second cell. A handover process is deduced by analogy. For specific embodiments, refer to steps S311 to S316 in FIG. 7B. There may be one or a plurality of second cells. It may be understood that when there is one second cell, operations performed by the first network device can be reduced, and operation efficiency may be improved. When there are a plurality of second cells, if the terminal device cannot be handed over to one of the second cells, the terminal device may alternatively choose to be handed over to another second cell. Handover stability is relatively high. At least two target cells that can be handed over to may be further determined by predicting a possible movement direction of the user equipment, where at least one of the at least two target cells that can be handed over to is used as a standby target cell.

In a specific application, the configuration information of the second cell includes the cell identifier, the cell frequency point value, and the handover condition. The cell identifier may be specifically a global identifier of the second cell or the like, and a cell may be uniquely determined by using a cell identifier. The cell frequency point value may be a communication frequency point of the second cell. When the terminal device is handed over to the second cell, the terminal device needs to be handed over to the cell frequency point value of the second cell, to implement communication in the second cell. The handover condition may be specifically: If a difference between signal quality of the terminal device and signal quality of the second cell is greater than a preset first threshold, the terminal device is handed over to the second cell; or if a difference between signal quality of the terminal device and signal quality of the second cell is greater than a preset second threshold, the terminal device is handed over to the second cell. The preset first threshold and the preset second threshold may be determined based on an actual application scenario. This is not specifically limited in this embodiment of this disclosure. It may be understood that the handover condition may also be determined based on an actual application scenario, so that after the terminal device is handed over to the second cell, signal quality of the terminal device is better than the signal quality of the terminal device before the terminal device is handed over. The handover condition is not specifically limited in this embodiment of this disclosure.

Specifically, for each handover item, the handover time information may include a measurement start time and a measurement end time. The terminal device may measure signal quality between the terminal device and the at least one second cell at the measurement start time. The signal quality may be specifically RSRP, RSRQ, received signal strength indication (RSSI), or the like. If the signal quality between the terminal device and the at least one second cell meets a handover condition of any one of the at least one second cell between the measurement start time and the measurement end time, the terminal device may send a handover request to the any second cell whose handover condition is met, to request to be handed over to the any second cell whose handover condition is met.

For example, Table 1 shows a table form of handover information including the N handover items. (tN_on, tN_off) is a measurement start time and a measurement end time that correspond to the $N^{th}$ handover, Cell_ID_N is a cell identifier corresponding to the $N^{th}$ handover, Freq_N is a cell frequency point value corresponding to the $N^{th}$ handover, and Signal_thresh_N is a handover condition corresponding to the $N^{th}$ handover.

TABLE 1

| Handover number | Handover/ Measurement time | Target cell configuration |
| --- | --- | --- |
| 1 | t1_on, t1_off | Cell_ID_1, Freq_1, Signal_thresh_1 |
| 2 | t2_on, t2_off | Cell_ID_2, Freq_2, Signal_thresh_2 |
| 3 | t3_on, t3_off | Cell_ID_3, Freq_3, Signal_thresh_3 |
| ... | ... | ... |
| N | tN_on, tN_off | Cell_ID_N, Freq_N, Signal_thresh_N |

Optionally, N is any positive integer from 1 to 8.

In this embodiment of this disclosure, a period when a single satellite goes over the top of the terminal device and a beam distribution status of the single satellite are considered. If the value of N is excessively large, an accurate configurable cell to be handed over to may not be allocated to the terminal device. Therefore, based on an actual application scenario, for example, a maximum value of N may be set to 8. In other words, in the protocol, a value range of N is N □ {1, 2, 3, 4, 5, 6, 7, 8}, to obtain the accurate handover information. It may be understood that the value range of N may alternatively be a subset of the foregoing value range (including some elements in the full set), for example, {1, 2, 4, 5, 6}, {4, 5, 6, 7, 8}, and {4, 6, 8}. The foregoing value range may be determined based on time in which the satellite can serve the terminal device. This is not specifically limited in this embodiment of this disclosure.

Optionally, a closer distance between a geographical location of the terminal device and the central location of the first cell indicates a larger value of N. Alternatively, when the service type information of the terminal device is the statistical duration of the service, longer statistical duration of the service of the terminal device indicates a larger value of N. Alternatively, when the movement status information of the terminal device includes a movement speed of the terminal device, a faster movement speed of the terminal device indicates a smaller value of N. Alternatively, when the capability information of the terminal device includes a buffering capability and/or a computing capability, a stronger buffering capability and/or a stronger computing capability of the terminal device indicate/indicates a larger value of N.

For example, a method of calculating N may be expressed as:

$$N = f(d, s, \lambda, c) = \frac{d_{max} s_{max} \lambda \cdot c}{d \cdot s \cdot \lambda_{max} c_{max}}$$

$$N \in \{1, 2, 3, 4, 5, 6, 7, 8\}$$

d and $d_{max}$ are respectively an actual distance and a maximum distance between the terminal device and a cell center point, s and $s_{max}$ are respectively an actual movement status and a maximum movement status value of the terminal device, $\lambda$ and $\lambda_{max}$ are respectively service duration and maximum duration of the terminal device, and c and $c_{max}$ are respectively a terminal capability and a maximum terminal capability value corresponding to the terminal device. It may be understood that, in an actual application, the value of N calculated according to the foregoing formula may further need to be quantized, and finally obtained from the set {1, 2, 3, 4, 5, 6, 7, 8}. A coordination constant may further be added to the foregoing formula, to adapt to different application scenario characteristics. This is not specifically limited in this embodiment of this disclosure.

For example, in a scenario, movement status information s of the terminal device is classified into three states based on the movement speed of the terminal device: high, medium, and low. Geographical location information d of the terminal device is classified into two states based on the distance between the geographical location of the terminal device and the center of the serving cell: far and close. Service type information $\lambda$ of the terminal device is classified into two states based on the currently running service of the terminal device: long and short. Capability information c of the terminal device is classified into two states based on a device capability of the terminal device: strong and weak. In this case, in a combination scenario of d and s, the value of N may be shown in Table 2.

TABLE 2

| Scenario | Value of N |
| --- | --- |
| $(s_{high}, d_{far})$ | 1 |
| $(s_{medium}, d_{far})$ | 2 |
| $(s_{low}, d_{far})$ | 3 |
| $(s_{high}, d_{close})$ | 4 |
| $(s_{medium}, d_{close})$ | 5 |
| $(s_{low}, d_{close})$ | 6 |

It may be understood that in at least two combinations of (d, s, $\lambda$, and c), the value of N adaptively varies, and the specific value of N may be selected based on an actual application scenario and the geographic location information of the terminal device, the service type information of the terminal device, the terminal capability information of the terminal device, and/or movement status information of the terminal device. In addition, for (d, s, $\lambda$, c), when s, $\lambda$, and c are the same, a closer distance between the geographical location d of the terminal device and the central location of the first cell indicates a larger value of N. Alternatively, when s, d, and c are the same, and the service type information $\lambda$ of the terminal device is the statistical duration of the service, longer statistical duration of the service of the terminal device indicates a larger value of N. Alternatively, when k, d, and c are the same, and the movement status information s of the terminal device includes the movement speed of the terminal device, a faster movement speed of the terminal device indicates a smaller value of N. Alternatively, when k, d, and s are the same, and the terminal device capability information c includes the buffering capability and/or the computing capability, a stronger buffering capability and/or a stronger computing capability of the terminal device indicate/indicates a larger value of N. This is not specifically limited in this embodiment of this disclosure.

In this embodiment of this disclosure, different accurate N values may be determined based on information such as the location information, the movement status, the terminal capability, and the service type that are of the terminal device.

Optionally, after step S102, the method may further include: The first network device determines an earliest handover time period based on handover time information in the N handover items. The first network device sends a resource reservation request to a second network device of a target cell, where the target cell is a second cell included in a handover item corresponding to the earliest handover time period, and the resource reservation request is used to request the second network device of the target cell to reserve a resource for the terminal device within the earliest handover time period. The first network device receives a reservation response message of the second network device of the target cell.

In this embodiment of this disclosure, to ensure that the terminal device can be successfully handed over to the target cell in the handover time information, the target cell needs to reserve the resource for the terminal device within the handover time period corresponding to the handover time information. Therefore, the first network device may determine the handover item corresponding to the earliest handover time period in the N handover items, send the resource reservation request to the second cell corresponding to the handover item, to request at least one second cell (namely, the target cell) corresponding to the handover item to reserve the resource for the terminal device within the earliest handover time period. Adaptively, the second network device of the target cell may send the reservation response message to the first network device in response to the resource reservation request, and the first network device receives the reservation response message of the second network device of the target cell. This indicates that the second network device reserves the resource for the terminal device within the earliest handover time period.

It may be understood that, if the second network device of the second cell of the handover item does not receive the handover request of the terminal device within the handover time period corresponding to the handover time information of the handover item, or the second network device of the second cell of the handover item receives the handover request of the terminal device, but a handover fails, the second network device may automatically release the reserved resource, to ensure efficient resource utilization in a consecutive handover process.

Optionally, after step S102, the method may further include: The first network device stores the handover information.

Figure 4:
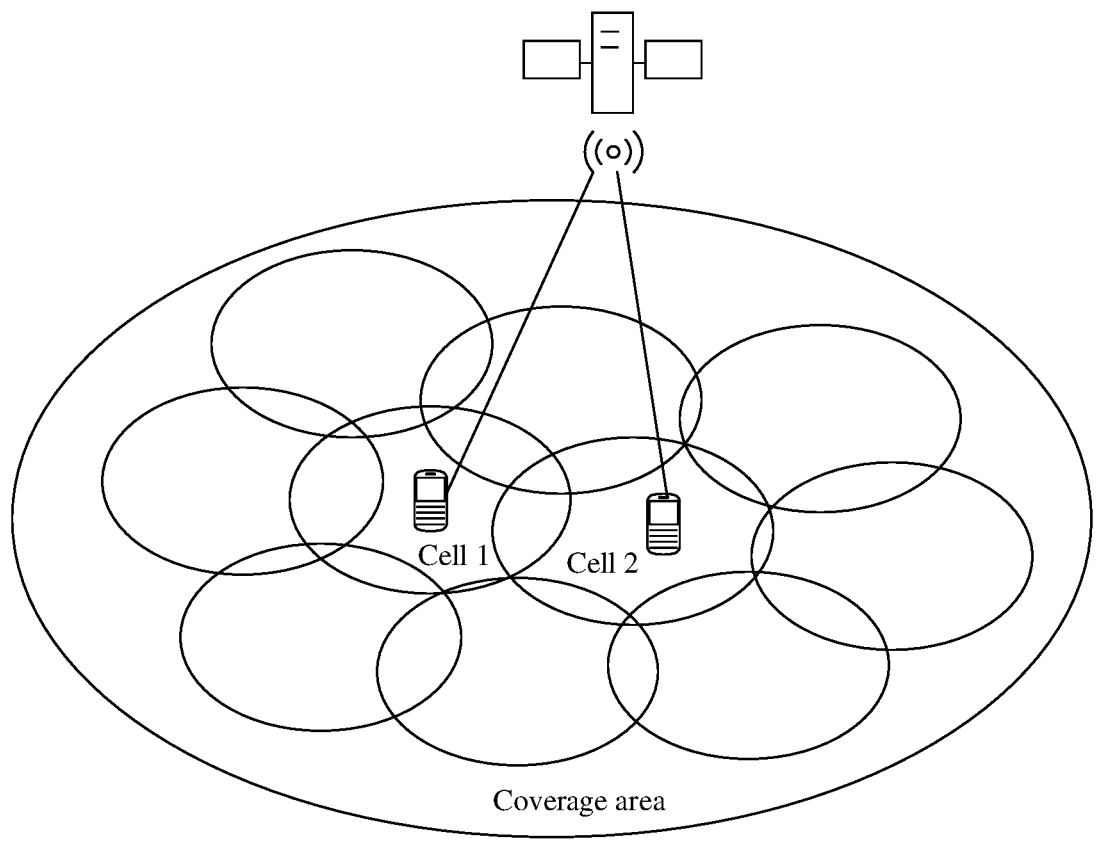
FIG. 4 is a schematic diagram of an intra-satellite cell handover of a terminal device according to an embodiment of this disclosure.
Figure 5:
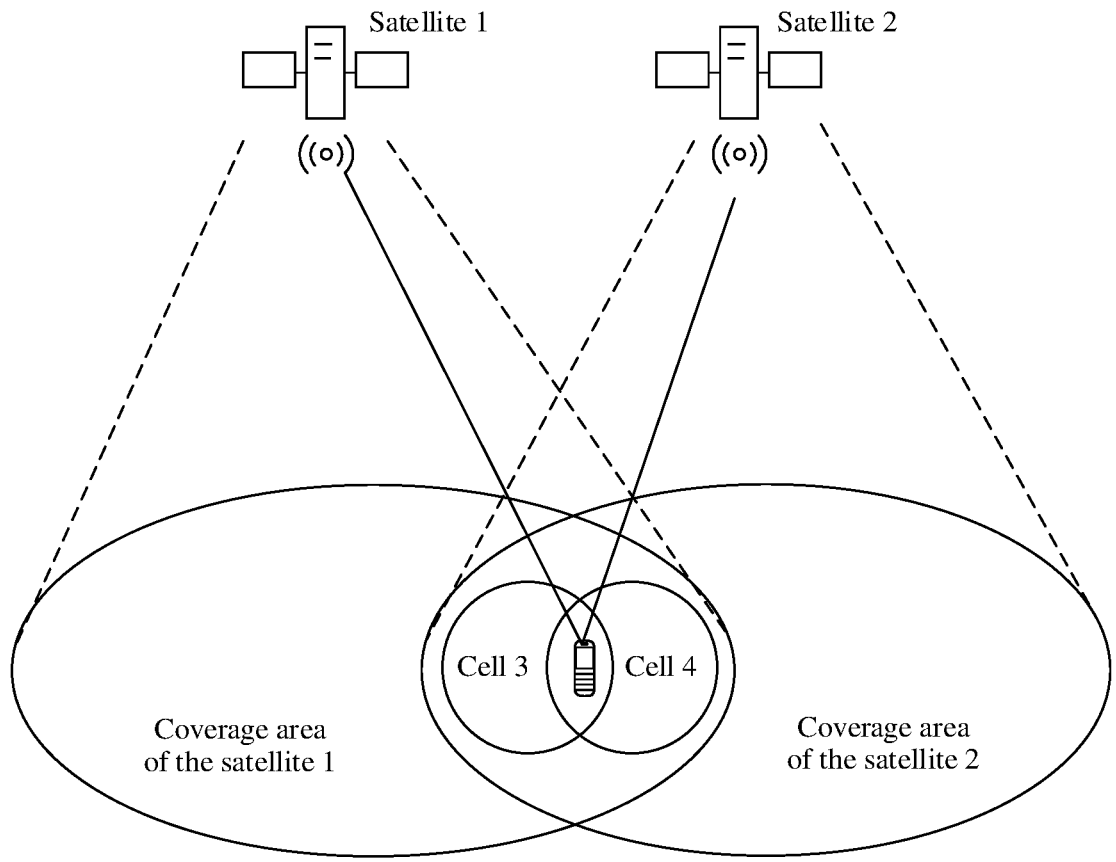
FIG. 5 is a schematic diagram of an inter-satellite cell handover of a terminal device according to an embodiment of this disclosure.

In a specific application, the handovers of the terminal device in the satellite cells may include an intra-satellite cell handover and an inter-satellite cell handover. FIG. 4 shows an application scenario of an intra-satellite cell handover. As shown in FIG. 4, the terminal device performs a handover between different cells of a same satellite. For example, the satellite moves from right to left, and the terminal needs to perform the intra-satellite cell handover, that is, perform the handover from a cell 1 of the satellite to a cell 2 of the satellite. FIG. 5 shows an application scenario of an inter-satellite cell handover. As shown in FIG. 5, the terminal device performs a handover between different cells of different satellites. For example, the satellites move from right to left, and the terminal needs to perform the inter-satellite cell handover, that is, perform the handover from a cell 1 of a satellite 1 to a cell 2 of a satellite 2.

When the terminal device performs the intra-satellite cell handover, the handover information is stored in the satellite, and the satellite may automatically reserve, based on the stored handover information, the resource for the terminal device in the second cell corresponding to the handover item in the handover time information of each handover item. When the terminal device performs the inter-satellite cell handover, the handover information is stored in the satellite that is used as the first network device, and the first network device may send, based on the stored handover information, the resource reservation request to the second network device of the second cell corresponding to the handover item in the handover time information of each handover item, to request the second network device to reserve the resource for the terminal device.

Optionally, in step S103, a handover command (mobility controlInfo) information element (IE) carried in the RRC message includes the handover information.

In this embodiment of this disclosure, a field corresponding to the handover information may be added to the handover command information element carried in the RRC message, so that the handover information may be carried in the RRC message and sent to the terminal device.

Optionally, the handover time information included in each handover item is the measurement start time and a first time offset; or the measurement end time and a second time offset; or the measurement start time and the measurement end time.

For example, when the handover time information included in each handover item is the measurement start time and the measurement end time, corresponding code may be:

```
-- ASN1START
-- TAG-MEAS-CONFIG-START
    t-MeasureConfig : : = Sequence {
        t-Meas-On BIT STRING (SIZE (32))
    t-Meas-Off BIT STRING (SIZE (32))
    }
    targetSignalValue targetValue
-- TAG-MEAS-CONFIG-STOP
-- ASN1STOP
``` t-Meas-On may be 32 bits and represents the measurement start time, t-Meas-Off may be 32 bits and represents the measurement start time, and targetSignalValue may represent the signal quality between the terminal device and the at least one second cell.

For example, when the handover time information included in each handover item is the measurement start time and the first time offset, or the measurement end time and the second time offset, corresponding code may be:

```
-- ASN1START
-- TAG-MEAS-CONFIG-START
    t-MeasureConfig : : = Sequence {
        t-Meas-On BIT STRING (SIZE (32))
    t-Offset BIT STRING (SIZE (12))
    }
-- TAG-MEAS-CONFIG-STOP
-- ASN1STOP
``` t-Meas-On may be 32 bits and represents the measurement start time or the measurement end time, t-Offset represents the first time offset or the second time offset, and targetSignalValue may represent the signal quality between the terminal device and the at least one second cell.

In a specific application, because an LEO satellite height is 600 km to 1500 km and a minimum speed is 7 km/s, and a typical cell diameter is 200 km, a maximum residence time of a user in a cell is about 30s. If time precision of 10 ms is used, a maximum value of t-offset is 3000, which may be represented by 12 bits. Therefore, the first time offset and the second time offset may be set to 12 bits.

It should be noted that the first network device may alternatively be a core network device communicating with a satellite. It may be understood that, when the first network device is the core network device, the satellite may be used only as a receiving and sending device, and the running information of the first network device may be running information of the satellite communicating with the core network device. All the steps of determining the cell handover in this embodiment of this disclosure are performed by the core network device, so that computing load of the satellite can be reduced by using the core network device. A specific cell handover determining method is similar to a manner when the first network device is the satellite, and details are not described herein again.

In conclusion, this embodiment of this disclosure provides the cell handover method and device. The cell currently serving the terminal device is the first cell, and the first network device of the first cell obtains the user information of the terminal device, and then the first network device may determine the handover information based on the user information and the running information of the first network device, so that after the first network device sends the RRC message including the handover information to the terminal device, the terminal device may perform the N consecutive cell handovers based on the handover information. In the N cell handovers, the first network device only needs to obtain the user information once, to configure handover conditions for the N subsequent handovers in advance at a time, thereby simplifying a network signaling procedure and reducing network overheads. Further, handover response time can be reduced, so that this embodiment of this disclosure is applicable to a network handover in the satellite scenario.

Figure 6:
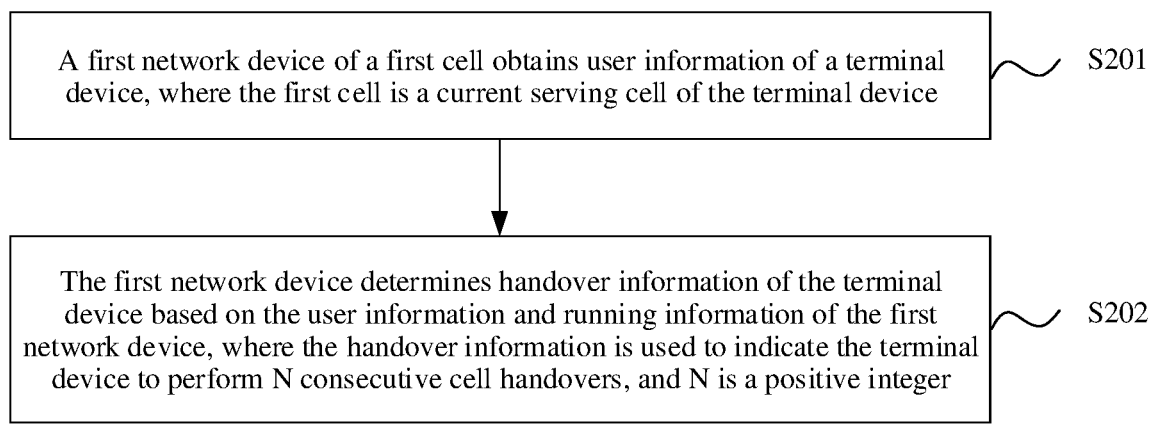
FIG. 6 is a schematic flowchart of still another cell handover method according to an embodiment of this disclosure.

FIG. 6 is a flowchart of still another cell handover method according to an embodiment of this disclosure. As shown in FIG. 6, the method provided in this embodiment includes the following steps.

Step S201: A terminal device sends user information of the terminal device to a first network device of a first cell, where the first cell is a current serving cell of the terminal device.

For the specific user information of the terminal user, refer to description of the embodiment corresponding to FIG. 3. Details are not described herein again.

Step S202: The terminal device receives a radio resource connection RRC message sent by the first network device, where the RRC message includes handover information, the handover information is determined based on the user information and running information of the first network device, the handover information is used to indicate the terminal device to perform N consecutive cell handovers, and N is a positive integer.

Optionally, the running information of the first network device includes at least one of the following: location information of the first network device and neighboring cell information of the first cell.

Optionally, the handover information includes N handover items, each handover item includes handover time information and configuration information of at least one second cell, the second cell is a next cell to be handed over to, and configuration information of each second cell includes a cell identifier, a cell frequency point value, and a handover condition.

Optionally, the terminal device performs the N consecutive cell handovers based on the handover information including: The terminal device performs the handovers based on a sequence of the handover time information included in the N handover items. That the terminal device performs a handover based on each handover item includes: measuring, in the handover time information included in the handover item, signal quality of a second cell included in the handover item; when signal quality of a target cell in the second cell included in the handover item meets a handover condition of the target cell, sending a handover instruction to the target cell; and when the terminal device is handed over to the target cell, performing, by the terminal device, a handover operation of a next handover item whose handover time information is adjacent to the handover time information of the handover item.

In this embodiment of this disclosure, after receiving the handover information, the terminal device may store the handover information, and perform the N consecutive cell handovers based on the handover information. Specifically, the terminal device may perform the handovers based on the sequence of the handover time information included in the N handover items. For the $n^{th}$ handover item, where n is an integer between 1 and N, that the terminal device performs a handover based on the $n^{th}$ handover item includes: Based on a clock t of the terminal device, when tn_on (a measurement start time of the $n^{th}$ handover item)<t<tn_off (a measurement end time of the $n^{th}$ handover item), the terminal device measures signal quality of a second cell included in the $n^{th}$ handover item, uses a cell whose signal quality meets a handover condition of the second cell as a target cell, and sends a handover instruction to the target cell, to perform cell handover procedures such as synchronization, access, and handover response. When the terminal device is handed over to the target cell, the terminal device performs a handover operation of a next handover item whose handover time information is adjacent to the handover time information of the handover item. A handover process is similar to a manner of the $n^{th}$ handover item, and details are not described herein again.

Optionally, when there is no second cell whose signal quality meets the handover condition in the handover time included in the handover item, it indicates that the handover information does not comply with an actual handover of the terminal device, and the terminal device may terminate a procedure of the N cell handovers. Then, the terminal device or the first network device may initiate a cell handover reconfiguration procedure.

It may be understood that after completing the handover of the $n^{th}$ handover item, the terminal device may delete the $n^{th}$ handover item, to avoid occupying a resource by the $n^{th}$ handover item.

Optionally, N is any positive integer from 1 to 8.

Optionally, a closer distance between a geographical location of the terminal device and a central location of the first cell indicates a larger value of N. Alternatively, when service type information of the terminal device is statistical duration of a service, longer statistical duration of the service of the terminal device indicates a larger value of N. Alternatively, when movement status information of the terminal device includes a movement speed of the terminal device, a faster movement speed of the terminal device indicates a smaller value of N. Alternatively, when capability information of the terminal device includes a buffering capability and/or a computing capability, a stronger buffering capability and/or a stronger computing capability of the terminal device indicate/indicates a larger value of N.

Optionally, a handover command information element carried in the RRC message includes the handover information.

Optionally, the handover time information included in each handover item is a measurement start time and a first time offset; or a measurement end time and a second time offset; or a measurement start time and a measurement end time.

Optionally, the first network device is a satellite, or a core network device communicating with a satellite.

For a manner of determining N in this embodiment of the present invention, refer to the description of the embodiment corresponding to FIG. 3. Details are not described herein again.

Optionally, in step S201, the terminal device may passively send the user information of the terminal device to the first network device. Specifically, a terminal device sends user information of the terminal device to a first network device of a first cell including: The terminal device receives a measurement configuration message sent by the first network device of the first cell. The terminal device returns a measurement report to the first network device in response to the measurement configuration message, where the measurement report includes the user information of the terminal device.

It may be understood that the terminal device may actively send the user information of the terminal device to the first network device. For example, the terminal device actively sends the user information of the terminal device to the first network device based on an actual application scenario. This is not specifically limited in this embodiment of this disclosure.

Optionally, the user information of the terminal device includes at least one of the following: geographical location information of the terminal device, the service type information of the terminal device, the terminal capability information of the terminal device, and the movement status information of the terminal device. In conclusion, this embodiment of this disclosure provides the cell handover method and device. The cell currently serving the terminal device is the first cell, and the terminal device sends the user information of the terminal device to the first network device of the first cell, and then the first network device may determine the handover information based on the user information and the running information of the first network device, so that, after the first network device sends the RRC message including the handover information to the terminal device, the terminal device may receive the handover information, and may perform the N consecutive cell handovers based on the handover information. In the N cell handovers, the terminal device only needs to send the user information to the first network device of the first cell once, to configure handover conditions for the N subsequent handovers in advance at a time, thereby simplifying a network signaling procedure and reducing network overheads. Further, handover response time can be reduced, so that this embodiment of this disclosure is applicable to a network handover in a satellite scenario.

Figure 7A:
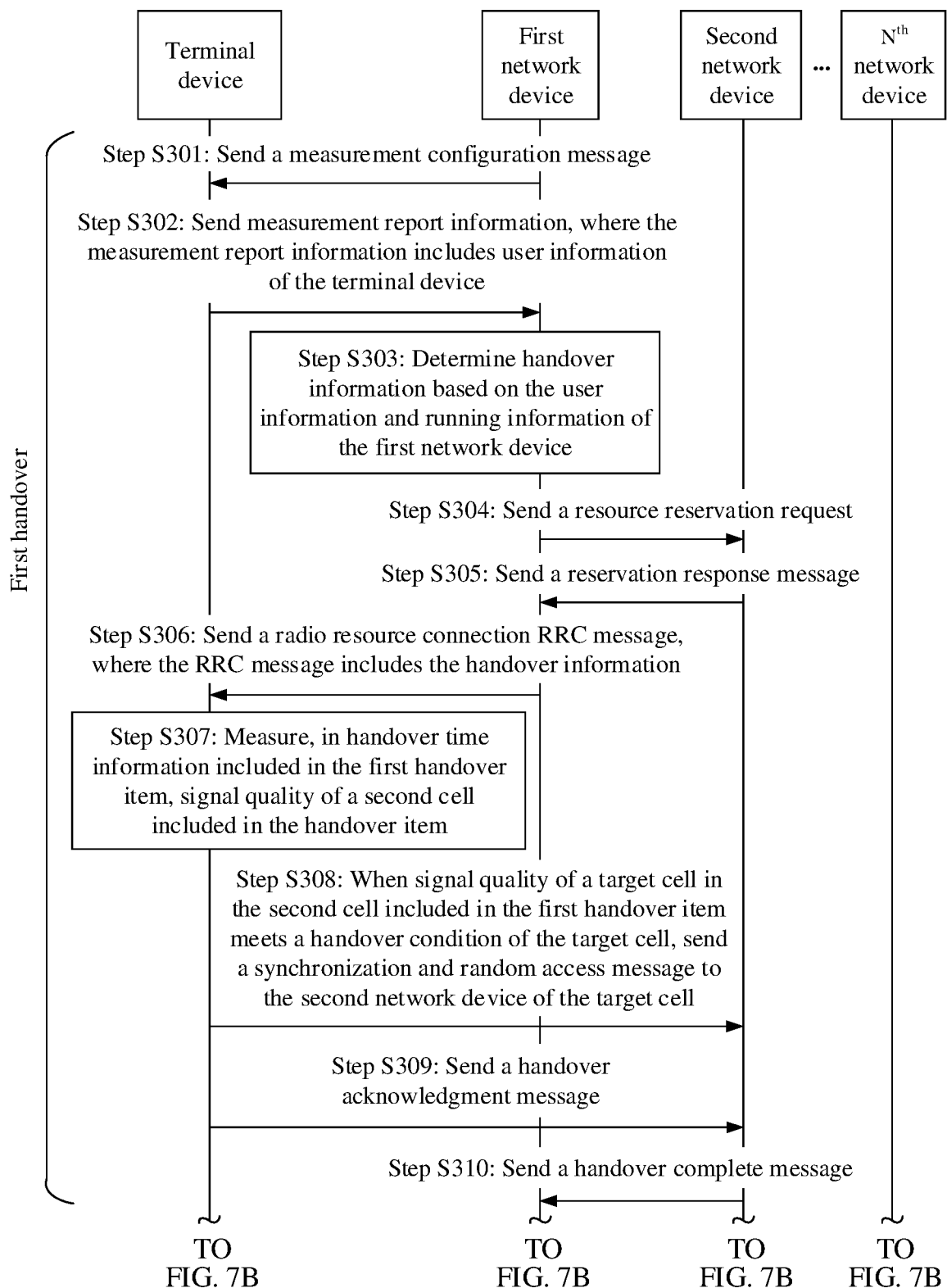
FIG. 7A and FIG. 7B is a schematic flowchart of signaling exchange in a cell handover method according to an embodiment of this disclosure.
Figure 7B:
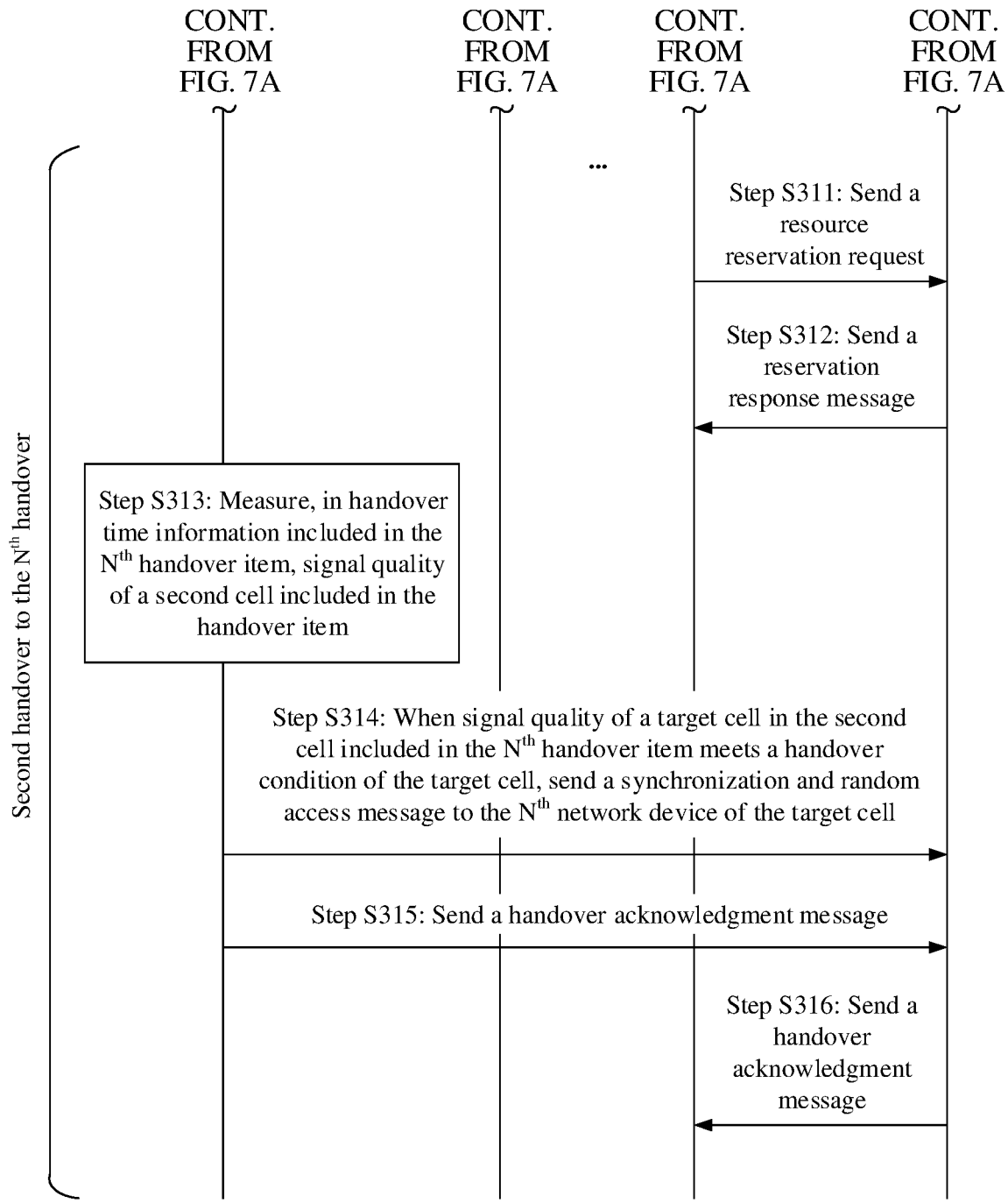

FIG. 7A and FIG. 7B is a schematic flowchart of signaling exchange in a cell handover method according to an embodiment of this disclosure. As shown in FIG. 7A and FIG. 7B, the signaling exchange in the cell handover method according to this embodiment of this disclosure may include the following steps.

Step S301: A first network device of a first cell sends a measurement configuration message to a terminal device.

In a specific application, the first network device may send specific measurement configuration items to the terminal device by using the measurement configuration message.

It should be noted that in this embodiment of this disclosure, normally, the measurement configuration message only needs to be delivered once when the terminal device initially establishes an RRC connection with the first network device; and until the terminal device completes N consecutive handovers, and enters a process of reconfiguring handover information, the first network device sends a new measurement configuration message.

It may be understood that if the terminal device fails to be handed over in any one of the N consecutive handovers, the first network device also needs to send the new measurement configuration message again, to enable the terminal device to enter the process of reconfiguring the handover information.

Step S302: The terminal device sends a measurement report to the first network device, where the measurement report includes user information of the terminal device.

In a specific application, after receiving the measurement configuration message, the terminal device may measure the user information of the terminal device, and feed back the measurement report including the user information of the terminal device to the first network device by using the measurement report message.

In this embodiment of this disclosure, normally, the measurement report message corresponds to the measurement configuration message, and generally, the measurement report message only needs to be sent once; and until the terminal device completes the N consecutive handovers, and enters the process of reconfiguring the handover information, the terminal device sends a new measurement report message in response to the new measurement configuration message.

Step S303: The first network device determines the handover information based on the user information and running information of the first network device.

In a specific application, after determining the handover information, the first network device may store the handover information, to perform subsequent operations by using the stored handover information.

Step S304: The first network device sends a resource reservation request to a second network device corresponding to a second cell in the first handover item.

In a specific application, the first network device may send the resource reservation request to the second network device corresponding to the second cell in the first handover item by using a reservation handover request (Early HO Request) message, to request the second network device to reserve a resource in handover time information in the first handover item. It may be understood that the process may alternatively correspond to a plurality of second cells, in other words, the plurality of second cells are requested to reserve resources in a specified time period, to ensure handover robustness. Because communication processes between second network devices of all the second cells and the terminal device are similar, only one second cell is used as an example for description in this embodiment of this disclosure.

Step S305: The second network device sends a reservation response message to the first network device.

In a specific application, the second network device may reserve the resource for the terminal device within a time period corresponding to the handover time information of the first handover item, and give a response by using a reservation handover acknowledgment (Early HO Acknowledgement) character as the reservation response message.

Step S306: The first network device sends a radio resource connection RRC message to the terminal device, where the RRC message includes the handover information.

In a specific application, the first network device may send the handover information to the terminal device by using the RRC message. A specific RRC message may be a handover command (CHO command) message.

Step S307: The terminal device measures, in the handover time information included in the first handover item, signal quality of the second cell included in the handover item.

In a specific application, the terminal device may measure, in the handover time information included in the first handover item in the handover information, the signal quality of the second cell included in the first handover item.

Step S308: When signal quality of a target cell in the second cell included in the first handover item meets a handover condition of the target cell, the terminal device sends a synchronization and random access message to the second network device of the target cell.

Step S309: The terminal device sends a handover acknowledgment message to the second network device.

In a specific application, when the signal quality of the target cell in the second cell included in the first handover item meets the handover condition of the target cell, the terminal device may initiate a handover to the second network device. Generally, the terminal device may first send the synchronization and random access message to the second network device, and then send the handover acknowledgment (HO confirm) message to the second network device, so that the terminal device can be handed over from the first network device to the second network device.

It may be understood that after the terminal device is successfully handed over to the second network device, the terminal device may delete the first handover item, to reduce an occupied resource.

Step S310: The second network device sends a handover complete message to the first network device.

In a specific application, the second network device may send the handover complete (HO complete) message to the first network device, to indicate that the terminal device is successfully handed over from the first network device to the second network device.

Step S311: An $(N-1)^{th}$ network device sends a resource reservation request to an $N^{th}$ network device. N−1 is a positive integer greater than or equal to 2.

Step S312: The $N^{th}$ network device sends a reservation response message to the $(N-1)^{th}$ network device.

In a specific application, after the terminal device is successfully handed over to the second network device, the second network device may take over a function of the first network device, send a resource reservation request to a third network device, and receive a reservation response message from the third network device.

By analogy, after the terminal device is successfully handed over to the $(N-1)^{th}$ network device, the $(N-1)^{th}$ network device may take over a function of a $(N-2)^{th}$ network device, send the resource reservation request to the $N^{th}$ network device, and receive the reservation response message from the $N^{th}$ network device.

It may be understood that the second cell (the second network device) may be a relative concept. After the terminal device is handed over to a second cell, the second cell becomes a current serving cell (the first cell), and a next cell to be handed over to (the third cell) that is of the original second cell becomes a current second cell. A handover process is deduced by analogy. Similarly, configuration information of at least one second cell in any handover item included in the handover information is also a same relative concept.

Step S313: The terminal device measures, in handover time information included in the $N1^{th}$ handover item, signal quality of a second cell included in the handover item.

Step S314: When signal quality of a target cell in the second cell included in the $N^{th}$ handover item meets a handover condition of the target cell, the terminal device sends a synchronization and random access message to the $N^{th}$ network device of the target cell.

Step S315: The terminal device sends a handover acknowledgment message to the $N^{th}$ network device.

Step S316: The $N^{th}$ network device sends a handover complete message to the $(N-1)^{th}$ network device.

In a specific application, when the signal quality of the target cell in the second cell included in the $N^{th}$ handover item meets the handover condition of the target cell, the terminal device may initiate a handover to the $N^{th}$ network device. Generally, the terminal device may first send the synchronization and random access message to the $N^{th}$ network device, and then send the handover acknowledgment (HO confirm) message to the $N^{th}$ network device, so that the terminal device is handed over from the $(N-1)^{th}$ network device to the $N^{th}$ network device. Therefore, N consecutive cell handovers of the terminal device are implemented.

It should be noted that, in the foregoing signaling procedure, a signaling procedure corresponding to the measurement configuration and the measurement report needs to be performed only for the first handover, and signaling procedures corresponding to the measurement configuration and the measurement report do not need to be performed for the second handover to the $N^{th}$ handover, so that signaling overheads can be reduced.

In conclusion, in this embodiment of this disclosure, a consecutive handover signaling procedure for configuring the N subsequent handovers in advance is used, thereby reducing the signaling overheads caused by measurement configuration and measurement report between the terminal device and the network devices for N−1 times.

Figure 8:
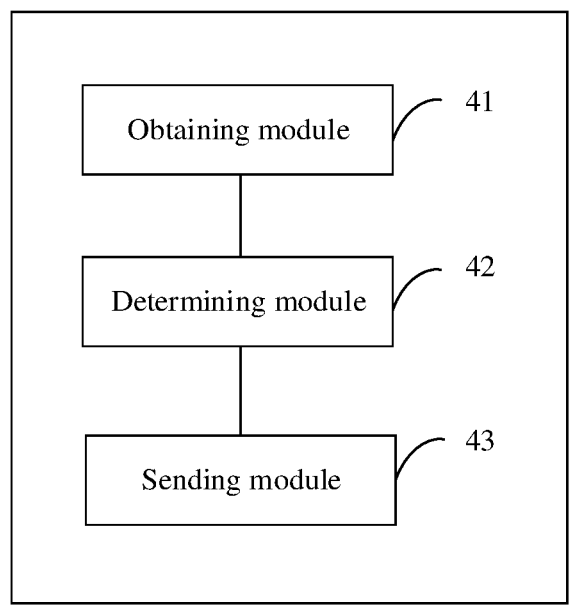
FIG. 8 is a schematic functional structural diagram of a first network device according to an embodiment of this disclosure.

FIG. 8 is a schematic functional structural diagram of a first network device according to an embodiment of this disclosure. As shown in FIG. 8, the first network device includes: an obtaining module 41, configured to obtain user information of a terminal device, where the first cell is a current serving cell of the terminal device; a determining module 42, configured to determine handover information of the terminal device based on the user information and running information of the first network device, where the handover information is used to indicate the terminal device to perform N consecutive cell handovers, and N is a positive integer, and a sending module 43, configured to send a radio resource control (RRC) message to the terminal device, where the RRC message includes the handover information.

In the apparatus, the first network device of the first cell obtains the user information of the terminal device, and then the first network device may determine the handover information based on the user information and the running information of the first network device, so that after the first network device sends the RRC message including the handover information to the terminal device, the terminal device may perform the N consecutive cell handovers based on the handover information. In the N cell handovers, the first network device only needs to obtain the user information once, to configure handover conditions for the N subsequent handovers in advance at a time, thereby simplifying a network signaling procedure and reducing network overheads. Further, handover response time can be reduced, so that this embodiment of this disclosure is applicable to a network handover in a satellite scenario.

In an example manner, the handover information includes N handover items, each handover item includes handover time information and configuration information of at least one second cell, the second cell is a next cell to be handed over to, and configuration information of each second cell includes a cell identifier, a cell frequency point value, and a handover condition.

In an example manner, the obtaining module 41 is further configured to send a measurement configuration message to the terminal device, and receive a measurement report returned by the terminal device in response to the measurement configuration message, where the measurement report includes the user information of the terminal device.

In an example manner, the user information of the terminal device includes at least one of the following: geographical location information of the terminal device, service type information of the terminal device, terminal capability information of the terminal device, and movement status information of the terminal device.

In the apparatus, it is considered that the geographical location information, the service type information, the terminal capability information, and the movement status information that are of the terminal device can better feed back a signal quality change status of the terminal device. Therefore, the geographical location information, the service type information, the terminal capability information, and the movement status information that are of the terminal device can be used to obtain relatively accurate handover information when the handover information is subsequently determined based on the user information of the terminal device.

In an example manner, a closer distance between a geographical location of the terminal device and a central location of the first cell indicates a larger value of N. Alternatively, when the service type information of the terminal device is statistical duration of a service, longer statistical duration of the service of the terminal device indicates a larger value of N. Alternatively, when the movement status information of the terminal device includes a movement speed of the terminal device, a faster movement speed of the terminal device indicates a smaller value of N. Alternatively, when the capability information of the terminal device includes a buffering capability and/or a computing capability, a stronger buffering capability and/or a stronger computing capability of the terminal device indicate/indicates a larger value of N.

In an example manner, the running information of the first network device includes at least one of the following: location information of the first network device and neighboring cell information of the first cell.

In an example manner, N is any positive integer from 1 to 8.

In the apparatus, a period when a singer satellite goes over the top of the terminal device and a beam distribution status of the single satellite are considered. If a value of N is excessively large, an accurate configurable cell to be handed over to may not be allocated to the terminal device. Therefore, the value of N is set to between 1 and 8, to obtain the accurate next cell to be handed over to.

In an example manner, the apparatus further includes a resource reservation module, configured to: determine an earliest handover time period based on handover time information in the N handover items; send a resource reservation request to a second network device of a target cell, where the target cell is a second cell included in a handover item corresponding to the earliest handover time period, and the resource reservation request is used to request the second network device of the target cell to reserve a resource for the terminal device within the earliest handover time period; and receive a reservation response message of the second network device of the target cell.

In this method, because the second network device reserves a resource for the terminal device within a specified time, a handover failure caused by resource occupation when the terminal device is handed over to the second network device can be avoided, thereby ensuring handover robustness.

In an example manner, a handover command information element carried in the RRC message includes the handover information.

In an example manner, the handover time information included in each handover item is a measurement start time and a first time offset; or a measurement end time and a second time offset; or a measurement start time and a measurement end time.

In an example manner, the apparatus further includes a storage module, configured to store the handover information.

In an example manner, the first network device is a satellite or a core network device communicating with a satellite.

The first network device in this embodiment may be configured to perform the method corresponding to the first network device. Specific implementations and technical effects are similar, and details are not described herein again.

Figure 9:
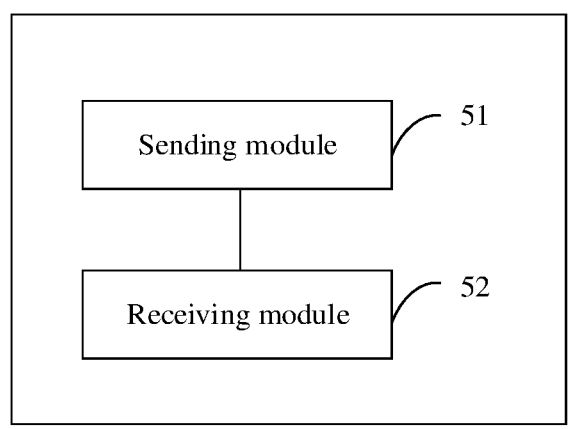
FIG. 9 is a schematic functional structural diagram of a terminal device according to an embodiment of this disclosure.

FIG. 9 is a schematic functional structural diagram of a terminal device according to an embodiment of this disclosure. As shown in FIG. 9, the terminal device includes:

a sending module 51, configured to send user information of the terminal device to a first network device of a first cell, where the first cell is a current serving cell of the terminal device; and a receiving module 52, configured to receive a radio resource control RRC message sent by the first network device, where the RRC message includes handover information, the handover information is determined based on the user information and running information of the first network device, the handover information is used to indicate the terminal device to perform N consecutive cell handovers, and N is a positive integer.

In the apparatus, the terminal device sends the user information of the terminal device to the first network device of the first cell, and then the first network device may determine the handover information based on the user information and the running information of the first network device, so that after the first network device sends the RRC message including the handover information to the terminal device, the terminal device may receive the handover information, and may perform the N consecutive cell handovers based on the handover information. In the N cell handovers, the terminal device only needs to send the user information to the first network device of the first cell once, to configure handover conditions for the N subsequent handovers in advance at a time, thereby simplifying a network signaling procedure and reducing network overheads. Further, handover response time can be reduced, so that this embodiment of this disclosure is applicable to a network handover in a satellite scenario.

In an example manner, the handover information includes N handover items, each handover item includes handover time information and configuration information of at least one second cell, the second cell is a next cell to be handed over to, and configuration information of each second cell includes a cell identifier, a cell frequency point value, and a handover condition.

In an example manner, that the terminal device performs the N consecutive cell handovers based on the handover information includes: The terminal device performs the handovers based on a sequence of the handover time information included in the N handover items. The terminal device performs a handover based on each handover item including: measuring, in the handover time information included in the handover item, signal quality of a second cell included in the handover item; when signal quality of a target cell in the second cell included in the handover item meets a handover condition of the target cell, sending a handover instruction to the target cell; and when the terminal device is handed over to the target cell, performing, by the terminal device, a handover operation of a next handover item whose handover time information is adjacent to the handover time information of the handover item.

In an example manner, the terminal device performs a handover based on each handover item further including: When there is no second cell whose signal quality meets the handover condition in the handover time included in the handover item, the terminal device terminates a procedure of the N cell handovers.

In an example manner, the user information of the terminal device includes at least one of the following: geographical location information of the terminal device, service type information of the terminal device, terminal capability information of the terminal device, and movement status information of the terminal device.

In the apparatus, it is considered that the geographical location information, the service type information, the terminal capability information, and the movement status information that are of the terminal device can better feed back a signal quality change status of the terminal device. Therefore, the geographical location information, the service type information, the terminal capability information, and the movement status information that are of the terminal device can be used to obtain relatively accurate handover information when the handover information is subsequently determined based on the user information of the terminal device.

In an example manner, a closer distance between a geographical location of the terminal device and a central location of the first cell indicates a larger value of N. Alternatively, when the service type information of the terminal device is statistical duration of a service, longer statistical duration of the service of the terminal device indicates a larger value of N. Alternatively, when the movement status information of the terminal device includes a movement speed of the terminal device, a faster movement speed of the terminal device indicates a smaller value of N. Alternatively, when the capability information of the terminal device includes a buffering capability and/or a computing capability, a stronger buffering capability and/or a stronger computing capability of the terminal device indicate/indicates a larger value of N.

In an example manner, the running information of the first network device includes at least one of the following: location information of the first network device and neighboring cell information of the first cell.

In an example manner, N is any positive integer from 1 to 8.

In the apparatus, a period when a singer satellite goes over the top of the terminal device and a beam distribution status of the single satellite are considered. If a value of N is excessively large, an accurate configurable cell to be handed over to may not be allocated to the terminal device. Therefore, the value of N is set to between 1 and 8, to obtain the accurate next cell to be handed over to.

In an example manner, the sending module is further configured to receive a measurement configuration message sent by the first network device of the first cell. The terminal device returns a measurement report to the first network device in response to the measurement configuration message, where the measurement report includes the user information of the terminal device.

In an example manner, a handover command information element carried in the RRC message includes the handover information.

In an example manner, the handover time information included in each handover item is a measurement start time and a first time offset; or a measurement end time and a second time offset; or a measurement start time and a measurement end time.

In an example manner, the apparatus further includes a storage module, configured to store the handover information.

In an example manner, the first network device is a satellite or a core network device communicating with a satellite.

The terminal device in this embodiment may be configured to perform the method corresponding to the terminal device. Specific implementations and technical effects are similar, and details are not described herein again.

Figure 10:
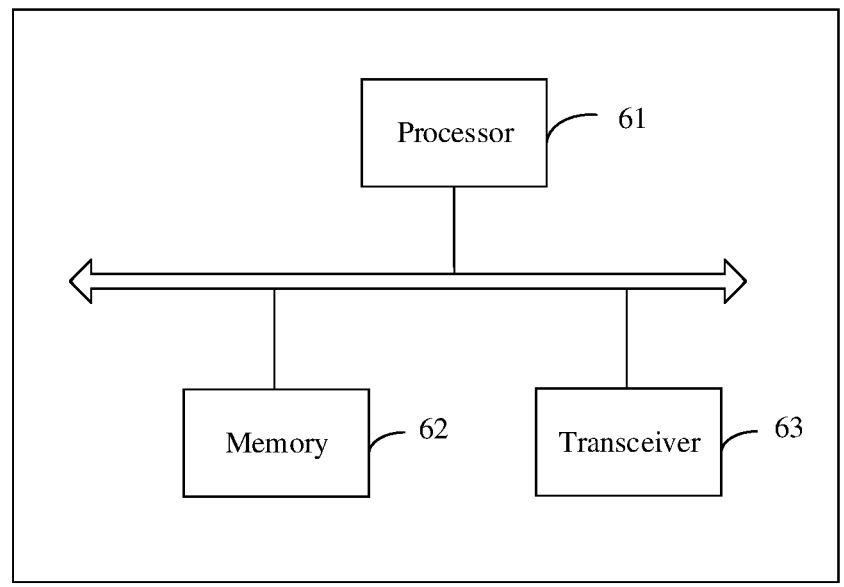
FIG. 10 is a schematic structural diagram of another first network device according to an embodiment of this disclosure.

FIG. 10 is a schematic structural diagram of another first network device according to an embodiment of this disclosure. As shown in FIG. 10, the first network device includes a processor 61, a memory 62, and a transceiver 63. The memory 62 is configured to store a computer program, and the transceiver 63 is configured to communicate with another device. The processor 61 is configured to execute the computer program stored in the memory 62, so that the first network device 61 performs the methods performed by the first network device in the foregoing embodiments.

Figure 11:
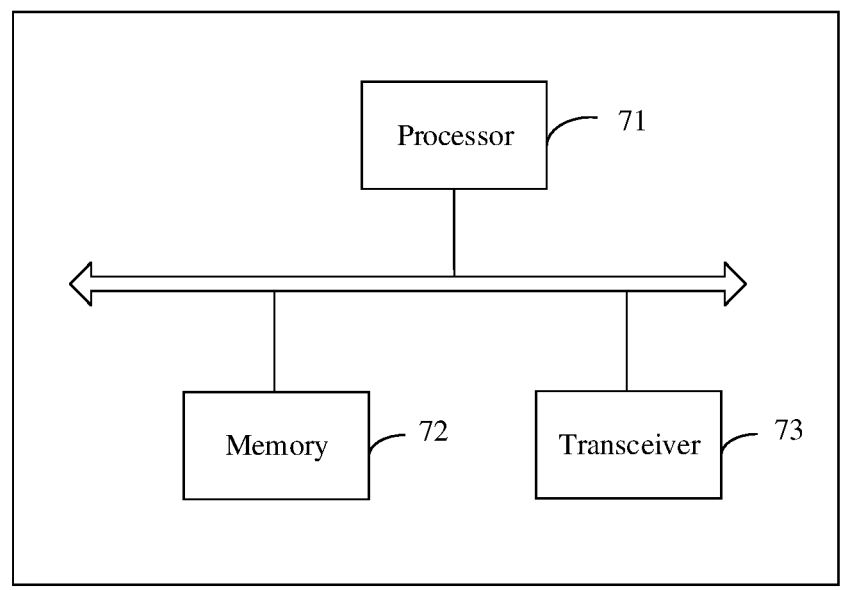
FIG. 11 is a schematic structural diagram of another terminal device according to an embodiment of this disclosure.

FIG. 11 is a schematic structural diagram of another terminal device according to an embodiment of this disclosure. As shown in FIG. 11, the terminal device includes a processor 71, a memory 72, and a transceiver 73. The memory 72 is configured to store a computer program, and the transceiver 73 is configured to communicate with another device. The processor 71 is configured to execute the computer program stored in the memory 72, so that the network device 71 performs the methods performed by the terminal device in the foregoing embodiments.

An embodiment of this disclosure further provides a satellite communication system. The satellite communication system includes a first network device and a terminal device, where the first network device is the first network device in any one of the foregoing implementations, and the terminal device is the terminal device in any one of the foregoing implementations.

An embodiment of this disclosure further provides a computer storage medium. The computer storage medium stores computer-readable instructions. When the computer-readable instructions are executed by a processor, the method provided in any one of the foregoing implementations is implemented.

An embodiment of this disclosure further provides a computer program product. The computer program product includes computer-readable instructions. When the computer-readable instructions are executed by a processor, the method provided in any one of the foregoing implementations is implemented.

An embodiment of this disclosure further provides a system on a chip or a system chip. The system on a chip or the system chip may be used in a network device. The system on a chip or the system chip includes at least one communication interface, at least one processor, and at least one memory. The communication interface, the memory, and the processor are interconnected through a bus. The processor executes instructions stored in the memory, so that the network device can perform the method on a first network device side.

An embodiment of this disclosure further provides a system on a chip or a system chip. The system on a chip or the system chip may be used in a terminal device. The system on a chip or the system chip includes at least one communication interface, at least one processor, and at least one memory. The communication interface, the memory, and the processor are interconnected through a bus. The processor executes instructions stored in the memory, so that the terminal device can perform the method on a terminal device side.

It may be understood that the processor used by the first network device or the terminal device in the embodiments of this disclosure may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this disclosure. The processor may alternatively be a combination of processors implementing a computing function, for example, a combination of one or more microprocessors or a combination of a DSP and a microprocessor.

The bus in the embodiments of this disclosure may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, the bus in the accompanying drawings of this disclosure is not limited to only one bus or only one type of bus.

In the several embodiments provided in this disclosure, it should be understood that the disclosed apparatus and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or may not be performed. In addition, the displayed or discussed mutual coupling or direct coupling or communication connection may be implemented through some interfaces. Indirect coupling or communication connection between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve objectives of the solutions of the embodiments.

In addition, functional units in the embodiments of this disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in the form of a software functional unit, the integrated unit may be stored in a computer-readable storage medium. The software functional unit is stored in a storage medium and includes several instructions for instructing a computer device (which may be a personal computer, a server, or a network device) or a processor to perform some steps of the methods described in the embodiments of this disclosure. The foregoing storage medium includes any medium that can store program code, for example, a USB flash drive, a removable hard disk, a read-only memory (ROM), a random access memory (RAM), a magnetic disk, or an optical disc.

A person of ordinary skill in the art may be aware that, in combination with the examples described in the embodiments disclosed in this specification, units and algorithm steps can be implemented by electronic hardware or a combination of computer software and electronic hardware. Whether the functions are performed by the hardware or the software depends on particular applications and design constraints of the technical solutions. A person skilled in the art may use different methods to implement the described functions for each particular application, but it should not be considered that the implementation goes beyond the scope of this disclosure.

A person skilled in the art may clearly understand that, for the purpose of convenient and brief description, for a detailed working process of the system and apparatus described above, refer to a corresponding process in the foregoing method embodiments, and details are not described herein again.

In the several embodiments provided in this disclosure, it should be understood that the disclosed system, apparatus, and method may be implemented in another manner. For example, the described apparatus embodiment is merely an example. For example, division into the units is merely logical function division and may be other division in an actual implementation. For example, a plurality of units or components may be combined or integrated into another system, or some features may be ignored or may not be performed. In addition, the displayed or discussed mutual coupling or direct coupling or communication connection may be implemented through some interfaces. Indirect coupling or communication connection between the apparatuses or units may be implemented in electrical, mechanical, or other forms.

When the functions are implemented in a form of a software function unit and sold or used as an independent product, the functions may be stored in a computer-readable storage medium. Based on such an understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this disclosure.

The foregoing descriptions are merely specific implementations of the present invention, but are not intended to limit the protection scope of the present invention. Any variation or replacement readily figured out by the person skilled in the art within the technical scope disclosed in the present invention shall fall within the protection scope of the present invention. Therefore, the protection scope of the present invention shall be subject to the protection scope of the claims.

What is claimed is:

1. A cell handover method comprising:
obtaining, by a first network device of a first cell, user information of a terminal device, wherein the first cell is a current serving cell of the terminal device;
determining, by the first network device, handover information of the terminal device based on the user information and operation information of the first network device, wherein the handover information is used to indicate to the terminal device to perform N consecutive cell handover(s), and N is a positive integer; and
sending, by the first network device, a radio resource control (RRC) message to the terminal device, wherein the RRC message comprises the handover information, wherein:
the user information of the terminal device comprises at least one of following: geographic location information of the terminal device, service type information of the terminal device, terminal capability information of the terminal device, or movement status information of the terminal device;
the operation information of the first network device comprises at least one of following: location information of the first network device or neighboring cell information of the first cell; and
the method is applied to a network handover in a satellite scenario.

2. The method according to claim 1, wherein N is any positive integer from 1 to 8.

3. The method according to claim 1, wherein a handover command information element carried in the RRC message comprises the handover information.

4. The method according to claim 1, wherein the first network device is a satellite or a core network device communicating with a satellite.

5. The method according to claim 1, wherein the first network device is a satellite and the operation information of the first network device is operation information of the satellite.

6. A cell handover method comprising:
obtaining, by a first network device of a first cell, user information of a terminal device, wherein the first cell is a current serving cell of the terminal device,
determining, by the first network device, handover information of the terminal device based on the user information and operation information of the first network device, wherein the handover information is used to indicate to the terminal device to perform ti consecutive cell handover(s), and N is a positive integer; and
sending, by the first network device, a radio resource control (RRC) message to the terminal device, wherein the RRC message comprises the handover information;
wherein the handover information comprises N handover item(s); each of the handover item(s) comprises handover time information and configuration information of at least one second cell; the at least one second cell is a next cell to be handed over to; and the configuration information of the at least one second cell comprises a cell identifier, a cell frequency point value, and a handover condition.

7. The method according to claim 2, wherein after the determining, by the first network device, of the handover information based on the user information and the operation information of the first network device, the method further comprises:

determining, by the first network device, an earliest handover time period based on the handover time information in the N handover item(s);
sending, by the first network device, a resource reservation request to a second network device of a target cell, wherein the target cell is the at least one second cell indicated in one of the handover item(s) as corresponding to the earliest handover time period, and the resource reservation request is used to request the second network device of the target cell to reserve a resource for the terminal device within the earliest handover time period; and
receiving, by the first network device, a reservation response message of the second network device of the target cell.

8. The method according to claim 2, wherein the handover time information comprised in each of the handover item(s) is:
a measurement start time and a first time offset; or
a measurement end time and a second time offset; or
a measurement start time and a measurement end time.

9. A cell handover method comprising:
obtaining, by a first network device of a first cell, user information of a terminal device wherein the first cell is a current serving cell of the terminal device;
determining, by the first network device, handover information of the terminal device based on the user information and operation information of the first network device, wherein the handover information is used to indicate to the terminal device to perform N consecutive cell handover(s), and N is a positive integer; and
sending, by the first network device, a radio resource control (RRC) message to the terminal device, wherein the RRC message comprises the handover information;
wherein:
the obtaining, by the first network device of the first cell, of the user information of the terminal device comprises:
sending, by the first network device, a measurement configuration message to the terminal device; and
receiving, by the first network device, a measurement report returned by the terminal device in response to the measurement configuration message, wherein the measurement report comprises the user information of the terminal device.

10. A cell handover method comprising:
sending, by a terminal device, user information of the terminal device to a first network device of a first cell, wherein the first cell is a current serving cell of the terminal device; and
receiving, by the terminal device, a radio resource control (RRC) message sent by the first network device, wherein the RRC message comprises handover information, the handover information is determined based on the user information and operation information of the first network device, the handover information is used to indicate to the terminal device to perform N consecutive cell handover(s), and N is a positive integer; wherein:
the user information of the terminal device comprises at least one of the following: geographical location intonation of the terminal device, service type information of the terminal device, terminal capability information of the terminal device, or movement status information of the terminal device;
the operation information of the first network device comprises at least one of following: location information of the first network device or neighboring cell information of the first cell; and the method is applied to a network handover in a satellite scenario.

11. The method according to claim 10, wherein N is any positive integer from 1 to 8.

12. The method according to claim 10, wherein a handover command information element carried in the RRC message comprises the handover information.

13. The method according to claim 10, wherein the first network device is a satellite or a core network device communicating with a satellite.

14. The method according to claim 10, wherein the first network device is a satellite and the operation information of the first network device is operation information of the satellite.

15. A cell handover method comprising:
sending, by a terminal device, user information of the terminal device to a first network device of a first cell, wherein the first cell is a current serving cell of the terminal device; and
receiving, by the terminal device, a radio resource control (RRC) message sent by the first network device, wherein the RRC message comprises handover information, the handover information is determined based on the user information and operation information of the first network device, the handover information is used to indicate to the terminal device to perform N consecutive cell handover(s), and N is a positive integer;
wherein the handover information comprises N handover item(s), each of the handover item(s) comprises handover time information and configuration information of at least one second cell, the at least one second cell is a next cell to be handed over to, and the configuration information of the at least one second cell comprises a cell identifier, a cell frequency point value, and a handover condition.

16. The method according to claim 15, wherein the terminal device performing the N consecutive cell handover(s) based on the handover information comprises:
performing, by the terminal device, the handover(s) based on a sequence of the handover time information comprised in the N handover item(s); wherein
the terminal device performing the handover(s) based respectively on each of the handover items comprises:
measuring, in the handover time information comprised in the handover item(s), signal quality of the at least one second cell comprised in the handover item(s);
when signal quality of a target cell in the at least one second cell comprised in the handover item(s) meets a handover condition of the target cell, sending a handover instruction to the target cell; and
when the terminal device is handed over to the target cell, performing, by the terminal device, a handover operation of a next handover item whose handover time information is adjacent to the handover time information of the handover item(s).

17. The method according to claim 15, wherein the handover time information comprised in each of the handover item(s) is:

a measurement start time and a first time offset; or
a measurement end time and a second time offset; or
a measurement start time and a measurement end time.

18. A cell handover method comprising:
sending, by a terminal device, user information of the terminal device to a first network device of a first cell, wherein the first cell is a current serving cell of the terminal device, and
receiving, by, the terminal device, a radio resource control (RRC) message sent by the first network device, wherein the RRC message comprises handover information, the handover information is determined based on the user information and operation information of the first network device, the handover information is used to indicate to the terminal device to perform N consecutive cell handover(s), and N is a positive integer;
wherein the sending, by the terminal device, user information of the terminal device to the first network device of the first cell comprises:
receiving, by the terminal device, a measurement configuration message sent by the first network device of the first cell; and
returning, by the terminal device, a measurement report to the first network device in response to the measurement configuration message, wherein the measurement report comprises the user information of the terminal device.

19. A cell handover method comprising:
sending, by a terminal device, user information of the terminal device to a first network device of a first cell, wherein the first cell is a current serving cell of the terminal device;
obtaining, by the first network device of the first cell, the user information of the terminal device;
determining, by the first network device, handover information of the terminal device based on the user information and operation information of the first network device, wherein the handover information is used to indicate to the terminal device to perform N consecutive cell handover(s), and N is a positive integer;
wherein the user information of the terminal device comprises at least one of the following: geographical location information of the terminal device, service type information of the terminal device, terminal capability information of the terminal device, or movement status information of the terminal device; and the operation information of the first network device comprises at least one of following: location information of the first network device or neighboring cell information of the first cell;
sending, by the first network device, a radio resource control RRC message to the terminal device, wherein the RRC message comprises the handover information; and
receiving, by the terminal device, the radio resource control (RRC) message sent by the first network device;
wherein the method is applied to a network handover in a satellite scenario.

* * * * *

UNITED STATES PATENT AND TRADEMARK OFFICE
CERTIFICATE OF CORRECTION

PATENT NO. : 11,917,465 B2
APPLICATION NO. : 17/536265
DATED : February 27, 2024
INVENTOR(S) : Yu Wang It is certified that error appears in the above-identified patent and that said Letters Patent is hereby corrected as shown below:

On the Title Page

1. Please correct the following:
(71) Applicant: HUAWEI TECHNOLOGIES CO., LTD.., Guangdong (CN)
Should be:
(71) Applicant: HUAWEI TECHNOLOGIES CO., LTD., Shenzhen (CN)

2. Under "OTHER PUBLICATIONS", please add the following reference:
Office Action issued in CN201910462911.9, dated March 24, 2021, 8 pages In the Claims 3. At Column 36, Line 60, Claim 10, the following should be:
the user information of the terminal device comprises at least one of the following: geographical location information of the terminal device, ...

Signed and Sealed this
Second Day of April, 2024

Katherine Kelly Vidal
*Director of the United States Patent and Trademark Office*